(12) United States Patent
Jayanth

(10) Patent No.: US 7,648,342 B2
(45) Date of Patent: Jan. 19, 2010

(54) COMPRESSOR PROTECTION AND DIAGNOSTIC SYSTEM

(75) Inventor: Nagaraj Jayanth, Sidney, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 91 days.

(21) Appl. No.: 11/402,316

(22) Filed: Apr. 11, 2006

(65) Prior Publication Data

US 2006/0222507 A1    Oct. 5, 2006

Related U.S. Application Data

(63) Continuation of application No. 11/027,757, filed on Dec. 30, 2004, now Pat. No. 7,290,989.

(60) Provisional application No. 60/533,236, filed on Dec. 30, 2003.

(51) Int. Cl.
F04B 49/06    (2006.01)

(52) U.S. Cl. .................. 417/44.11; 417/902; 417/410.5

(58) Field of Classification Search ............. 417/44.11, 417/902, 410.5, 26, 28
See application file for complete search history.

(56) References Cited

U.S. PATENT DOCUMENTS

| | | | |
|---|---|---|---|
| 3,232,519 A | 2/1966 | Long | |
| 3,339,164 A | 8/1967 | Landis et al. | |
| 4,470,092 A | 9/1984 | Lombardi | |
| 4,497,031 A | 1/1985 | Froehling et al. | |
| 4,520,674 A | 6/1985 | Canada et al. | |
| 4,630,670 A | 12/1986 | Wellman et al. | |
| 4,755,957 A | 7/1988 | White et al. | |
| 4,798,055 A | 1/1989 | Murray et al. | |
| 4,820,130 A * | 4/1989 | Eber et al. ..................... 417/32 |
| 4,831,560 A | 5/1989 | Zaleski | |
| 4,877,382 A | 10/1989 | Caillat et al. | |
| 4,881,184 A | 11/1989 | Abegg, III et al. | |
| 4,885,707 A | 12/1989 | Nichol et al. | |
| 4,885,914 A | 12/1989 | Pearman | |
| 4,964,060 A | 10/1990 | Hartsog | |
| 4,985,857 A | 1/1991 | Bajpai et al. | |
| 5,009,075 A | 4/1991 | Okoren | |
| 5,058,388 A | 10/1991 | Shaw et al. | |

(Continued)

FOREIGN PATENT DOCUMENTS

CN    1133425    10/1996

(Continued)

OTHER PUBLICATIONS

First Office Action issued by the Chinese Patent Office dated Sep. 5, 2008 regarding Application No. 200480015875.3.

(Continued)

Primary Examiner—Michael Cuff
Assistant Examiner—Vikansha S Dwivedi
(74) Attorney, Agent, or Firm—Harness, Dickey & Pierce, P.L.C.

(57) ABSTRACT

A compressor assembly includes a shell, a compressor housed within the shell, and a motor drivingly connected to the compressor. A printed circuit board supports at least one temperature sensor. Processing circuitry receives data from the printed circuit board to determine operating conditions of the compressor.

30 Claims, 22 Drawing Sheets

U.S. PATENT DOCUMENTS

| | | | |
|---|---|---|---|
| 5,071,065 A | 12/1991 | Aalto et al. | |
| 5,073,862 A | 12/1991 | Carlson | |
| 5,102,316 A | 4/1992 | Caillat et al. | |
| 5,115,406 A | 5/1992 | Zatezalo et al. | |
| RE34,001 E | 7/1992 | Wrobel | |
| 5,141,407 A | 8/1992 | Ramsey et al. | |
| 5,200,872 A * | 4/1993 | D'Entremont et al. | 361/25 |
| 5,209,076 A | 5/1993 | Kauffman et al. | |
| 5,209,400 A | 5/1993 | Winslow et al. | |
| 5,248,244 A | 9/1993 | Ho et al. | |
| 5,279,458 A | 1/1994 | DeWolf et al. | |
| 5,290,154 A | 3/1994 | Kotlarek et al. | |
| 5,299,504 A | 4/1994 | Abele | |
| 5,303,560 A | 4/1994 | Hanson et al. | |
| 5,311,451 A | 5/1994 | Barrett | |
| 5,320,506 A | 6/1994 | Fogt | |
| 5,335,507 A | 8/1994 | Powell | |
| 5,368,446 A | 11/1994 | Rode | |
| 5,381,669 A | 1/1995 | Bahel et al. | |
| 5,416,781 A | 5/1995 | Ruiz | |
| 5,440,890 A | 8/1995 | Bahel et al. | |
| 5,440,895 A | 8/1995 | Bahel et al. | |
| 5,446,677 A | 8/1995 | Jensen et al. | |
| 5,454,229 A | 10/1995 | Hanson et al. | |
| 5,460,006 A | 10/1995 | Torimitsu | |
| 5,481,481 A | 1/1996 | Frey et al. | |
| 5,499,512 A | 3/1996 | Jurewicz et al. | |
| 5,511,387 A | 4/1996 | Tinsler | |
| 5,528,908 A | 6/1996 | Bahel et al. | |
| 5,532,534 A | 7/1996 | Baker et al. | |
| 5,548,966 A | 8/1996 | Tinsler | |
| 5,596,507 A | 1/1997 | Jones et al. | |
| 5,613,841 A | 3/1997 | Bass et al. | |
| 5,615,071 A | 3/1997 | Isao et al. | |
| 5,623,834 A | 4/1997 | Bahel et al. | |
| 5,630,325 A | 5/1997 | Bahel et al. | |
| 5,656,767 A | 8/1997 | Garvey, III et al. | |
| 5,689,963 A | 11/1997 | Bahel et al. | |
| 5,707,210 A | 1/1998 | Ramsey et al. | |
| 5,713,724 A * | 2/1998 | Centers et al. | 417/53 |
| 5,857,348 A | 1/1999 | Conry | |
| 5,875,638 A | 3/1999 | Tinsler | |
| 5,924,295 A | 7/1999 | Park | |
| 5,956,658 A | 9/1999 | McMahon | |
| 5,975,854 A | 11/1999 | Culp, III et al. | |
| 6,081,750 A | 6/2000 | Hoffberg et al. | |
| 6,082,971 A | 7/2000 | Gunn et al. | |
| 6,092,378 A | 7/2000 | Das et al. | |
| 6,179,214 B1 | 1/2001 | Key et al. | |
| 6,181,033 B1 | 1/2001 | Wright | |
| 6,279,332 B1 | 8/2001 | Yeo et al. | |
| 6,302,654 B1 | 10/2001 | Millet et al. | |
| 6,406,265 B1 | 6/2002 | Hahn et al. | |
| 6,502,409 B1 | 1/2003 | Gatling et al. | |
| 6,558,126 B1 * | 5/2003 | Hahn et al. | 417/44.1 |
| 6,589,029 B1 | 7/2003 | Heller | |
| 6,615,594 B2 | 9/2003 | Jayanth et al. | |
| 6,672,846 B2 | 1/2004 | Rajendran et al. | |
| 6,966,759 B2 | 11/2005 | Hahn et al. | |
| 2001/0025349 A1 | 9/2001 | Sharood et al. | |
| 2002/0093259 A1 | 7/2002 | Sunaga et al. | |
| 2002/0127120 A1 | 9/2002 | Hahn et al. | |
| 2002/0170299 A1 | 11/2002 | Jayanth et al. | |
| 2004/0258542 A1 | 12/2004 | Wiertz et al. | |

FOREIGN PATENT DOCUMENTS

| | | |
|---|---|---|
| CN | 1297522 | 5/2001 |
| EP | 0 361 394 A2 | 4/1990 |
| EP | 0 453 302 A1 | 10/1991 |
| EP | 0 877 462 A2 | 11/1998 |
| GB | 2 062 919 A | 5/1981 |
| WO | WO 99/61847 A | 12/1999 |
| WO | WO 00/51223 A | 8/2000 |

OTHER PUBLICATIONS

Second Office Action issued by the Chinese Patent Office dated Feb. 27, 2009 regarding Application No. 200480015875.3.

* cited by examiner

COMPRESSOR PROTECTION AND DIAGNOSTIC SYSTEM

CROSS-REFERENCE TO RELATED APPLICATIONS

This application is a continuation of U.S. patent application Ser. No. 11/027,757 filed on Dec. 30, 2004, which claims the benefit of U.S. Provisional Application Ser. No. 60/533,236, filed on Dec. 30, 2003. The disclosures of the above applications are incorporated herein by reference.

FIELD

The present teachings relate to compressors, and more particularly, to an improved diagnostic system for use with a compressor.

BACKGROUND

Compressors are used in a wide variety of industrial and residential applications. More particularly, compressors are often used to circulate refrigerant within a refrigeration or heat pump system to provide a desired heating or cooling effect. In addition, compressors are also used to inflate or otherwise impart a fluid force on an external object such as a tire, sprinkler system, or pneumatic tool. In any of the foregoing applications, it is desirable that a compressor provide consistent and efficient operation to ensure that the particular application (i.e., refrigeration system or pneumatic tool) functions properly. To that end, alerting when a compressor has failed or is in need of repair helps prevent unnecessary compressor damage and system failures.

Compressors are intended to run trouble free for the life of the compressor and provide a consistent supply of compressed fluid. While compressors are increasingly reliable, monitoring operation of the compressor allows one to discontinue its operation should an error or fault arise. Discontinuing use of the scroll compressor under unfavorable conditions will likely prevent damage to the compressor.

Faults causing a compressor to shut down may be electrical or mechanical in nature. Electrical faults generally have a direct effect on the electric motor in the compressor, and may destroy the electric motor or its associated components. Mechanical faults may include faulty bearings or broken parts, and typically raise the internal temperature of the respective components to very high levels, sometimes causing malfunction of and damage to the compressor. In addition to mechanical and electrical faults, "system" faults may occur, such as those resulting from an adverse level of refrigerant or lubricant or to a blocked flow condition. Such system faults may raise the internal compressor temperature or pressure to high levels, which may damage the compressor.

SUMMARY

A compressor assembly generally includes a shell, a compressor housed within the shell, and a motor drivingly connected to the compressor. A sensor assembly is provided for monitoring operating parameters of the compressor assembly, including the temperature of an electrical conductor supplying current to the motor. Processing circuitry in communication with the sensor assembly processes the operating parameters of the compressor. A terminal assembly is hermetically secured to the shell and is in communication with the sensor assembly, while a connector is attached to the terminal assembly outside of the shell and serves to operably connect the processing circuitry with the sensor assembly.

BRIEF DESCRIPTION OF THE DRAWINGS

The present teachings will become more fully understood from the detailed description and the accompanying drawings, wherein.

DETAILED DESCRIPTION

The following description is merely exemplary in nature and is in no way intended to limit the teachings, its application, or uses.

With reference to the figures, a scroll compressor 10 is provided and includes a compressor protection and control system 12. The protection and control system 12 is operable to selectively shut down the compressor 10 in response to sensed compressor parameters in an effort to protect the compressor 10 and prevent operation thereof when conditions are unfavorable. While a scroll compressor 10 will be described herein, it should be understood that any compressor could be used with the protection and control system 12 of the present invention.

Figure 1:
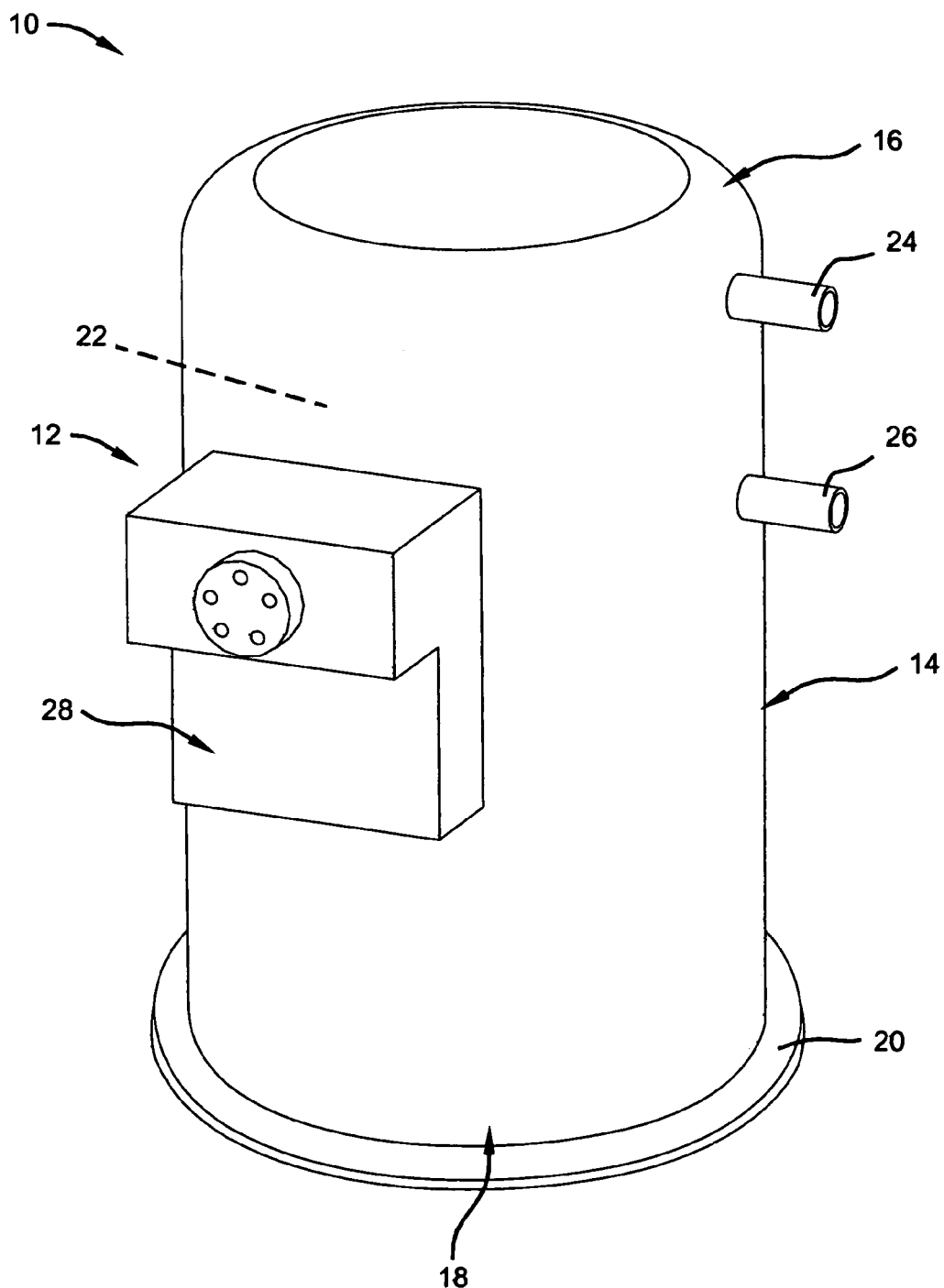
FIG. 1 is a perspective view of a compressor incorporating a first protection system in accordance with the teachings.
Figure 2:
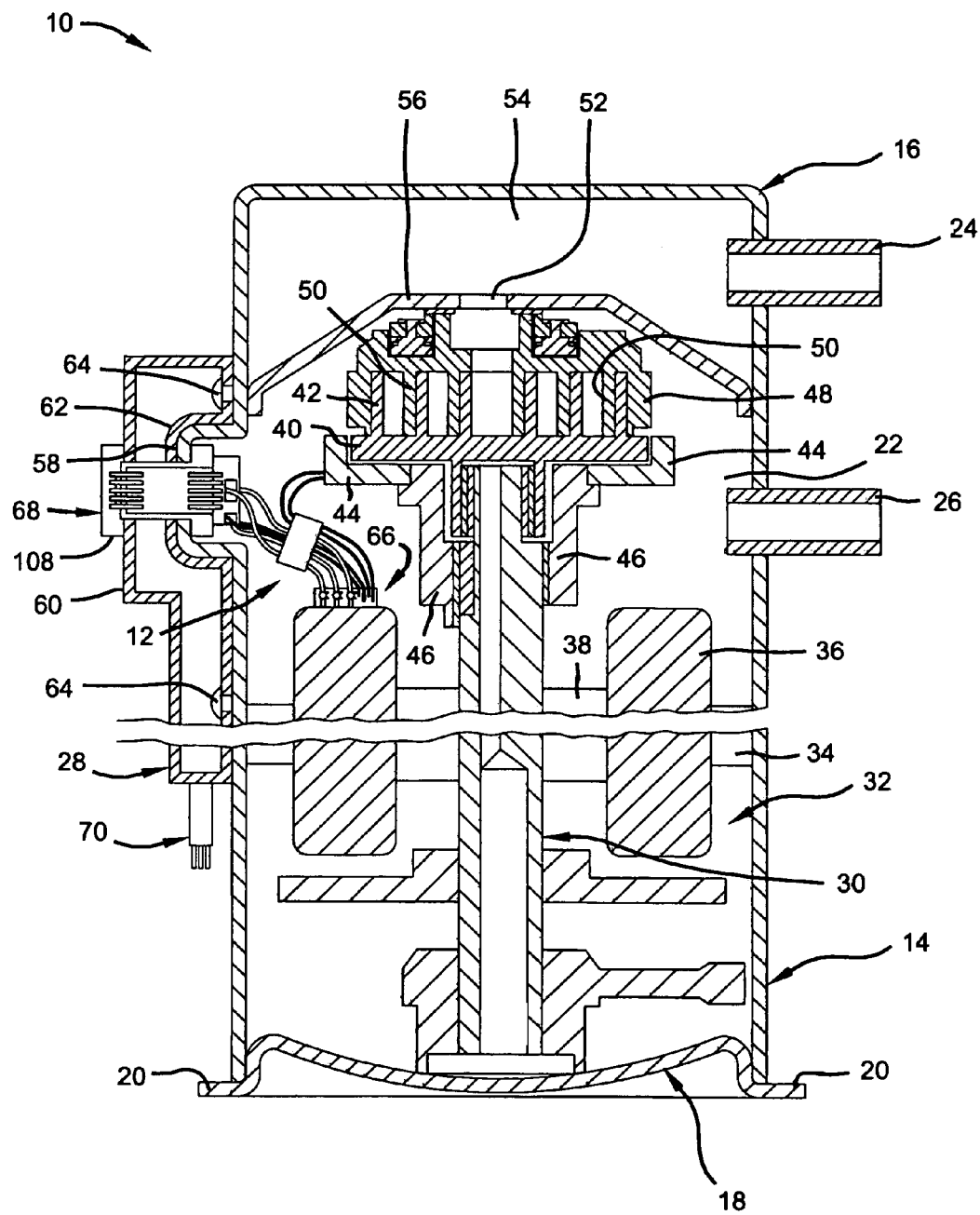
FIG. 2 is a cross-sectional view of the compressor of FIG. 1.
Figure 8:
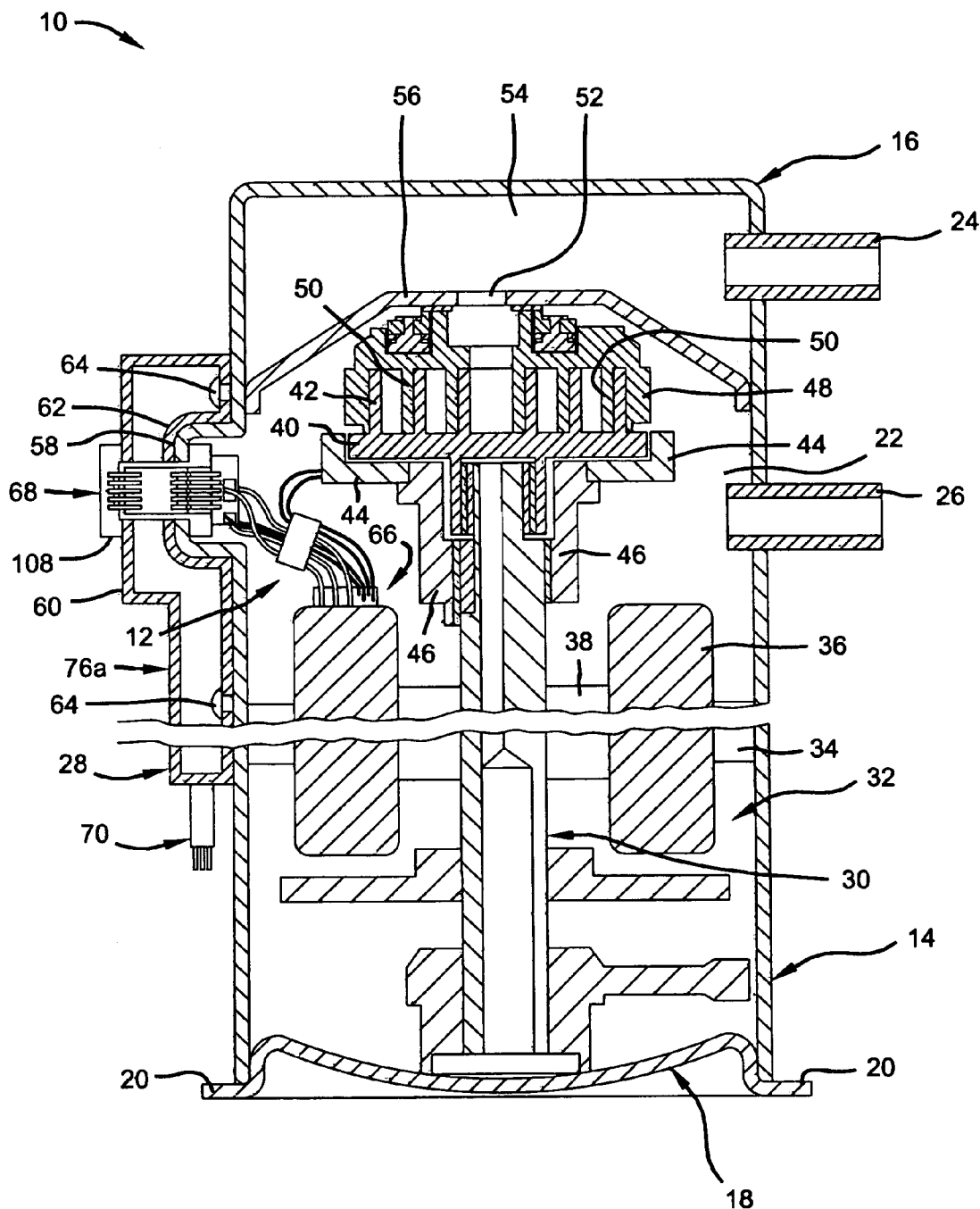
FIG. 8 is a cross-sectional view of the compressor of FIG. 7.
Figure 9:
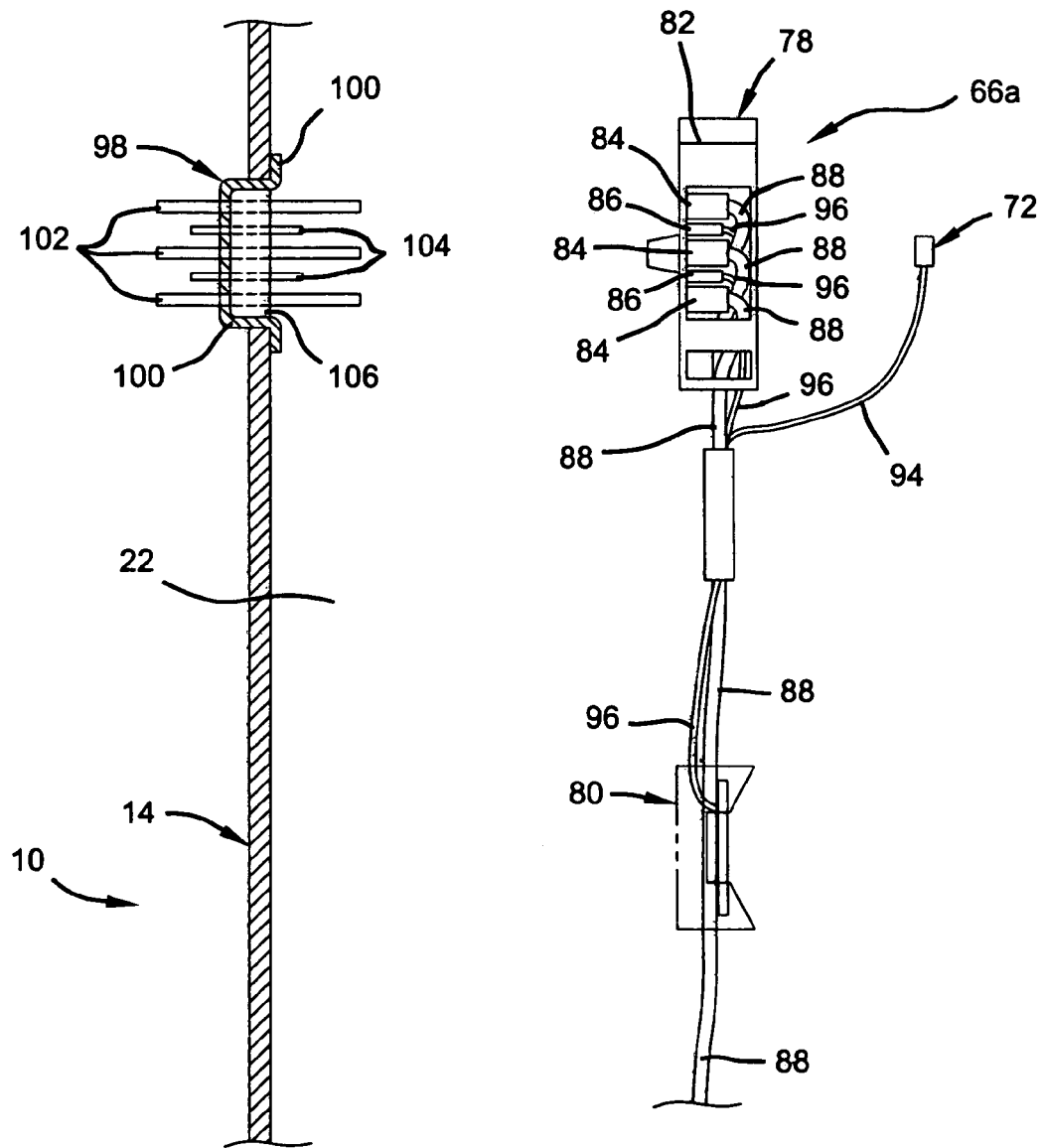
FIG. 9 is a more detailed sectional view of the protection system of FIG. 7.
Figure 10:
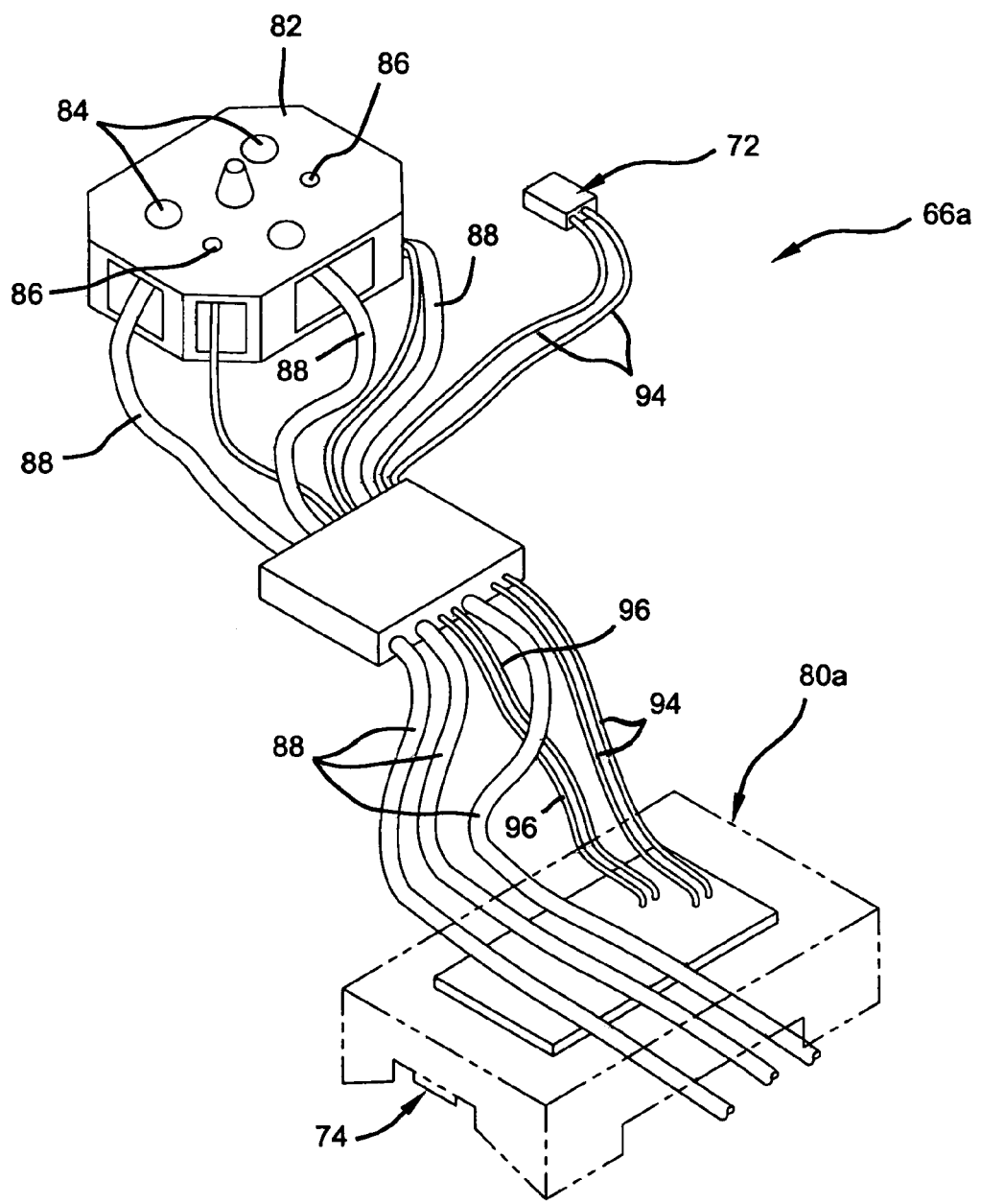
FIG. 10 is a perspective view of the protection system of FIG. 7.
Figure 11:
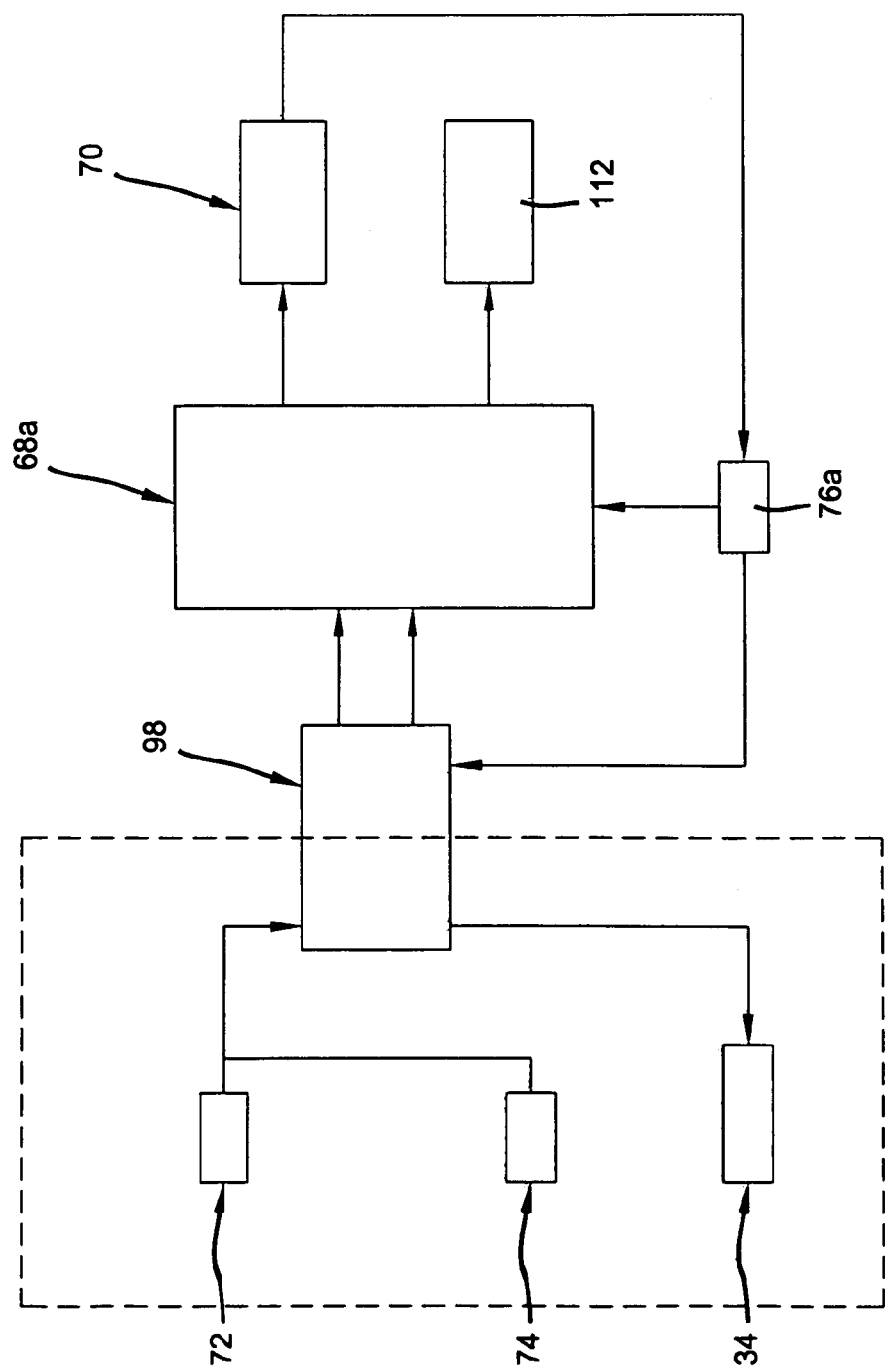
FIG. 11 is a schematic representation of the protection system of FIG. 7.
Figure 12:
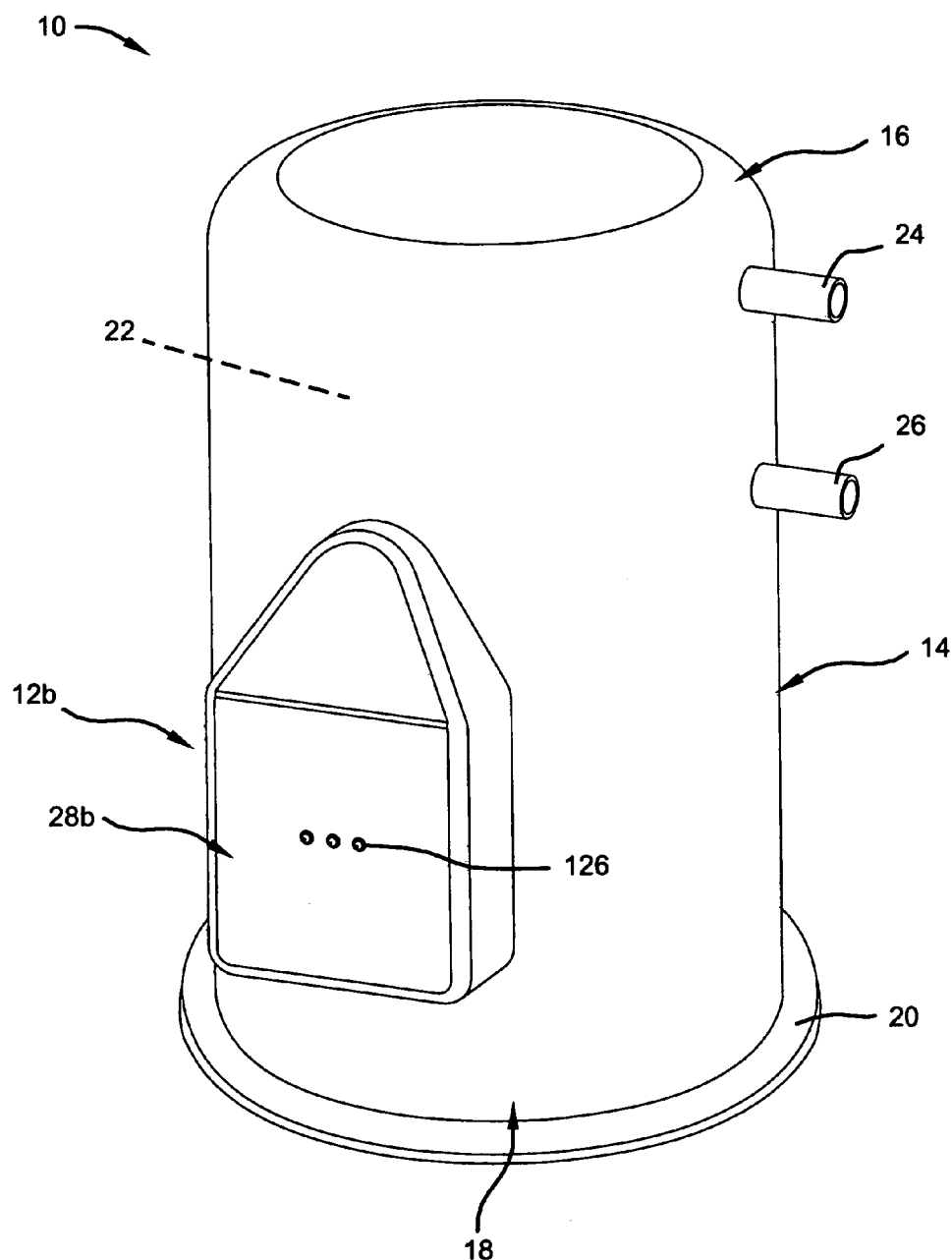
FIG. 12 is a perspective view of a compressor incorporating a third protection system in accordance with the teachings.

With particular reference to FIGS. 1 and 2, the compressor 10 is shown to include a generally cylindrical hermetic shell 14 having a welded cap 16 at a top portion and a base 18 having a plurality of feet 20 welded at a bottom portion. The cap 16 and base 18 are fitted to the shell 14 such that an interior volume 22 of the compressor 10 is defined. The cap 16 is provided with a discharge fitting 24, while the shell 14 is similarly provided with an inlet fitting 26, disposed generally between the cap 16 and base 14, as best shown in FIGS. 2 and 8. In addition, an electrical enclosure 28 is fixedly attached to the shell 14 generally between the cap 16 and base 18 and operably supports a portion of the protection system 12 therein, as will be discussed further below.

A crankshaft 30 is rotatively driven by an electric motor 32 relative to the shell 14. The motor 32 includes a stator 32 fixedly supported by the hermetic shell 14, windings 36 passing therethrough, and a rotor 38 press fitted on the crankshaft 30. The motor 32 and associated stator 34, windings 36, and rotor 38 are operable to drive the crankshaft 30 relative to the shell 14 to thereby compress a fluid.

The compressor 10 further includes an orbiting scroll member 40 having a spiral vane or wrap 42 on the upper surface thereof for use in receiving and compressing a fluid. An Oldham coupling 44 is positioned between orbiting scroll member 40 and a bearing housing 46 and is keyed to orbiting scroll member 40 and a non-orbiting scroll member 48. The Oldham coupling 44 is operable to transmit rotational forces from the crankshaft 30 to the orbiting scroll member 40 to thereby compress a fluid disposed between the orbiting scroll member 40 and non-orbiting scroll member 48. Oldham coupling 44 and its interaction with orbiting scroll member 40 and non-orbiting scroll member 48 is preferably of the type disclosed in assignee's commonly-owned U.S. Pat. No. 5,320,506, the disclosure of which is incorporated herein by reference.

Non-orbiting scroll member 48 also includes a wrap 50 positioned in meshing engagement with wrap 42 of orbiting scroll member 40. Non-orbiting scroll member 48 has a centrally disposed discharge passage 52 which communicates with an upwardly open recess 54. Recess 54 is in fluid communication with discharge fitting 24 defined by cap 16 and partition 56, such that compressed fluid exits the shell 14 via passage 52, recess 54, and fitting 24. Non-orbiting scroll member 48 is designed to be mounted to bearing housing 46 in a suitable manner such as disclosed in the aforementioned U.S. Pat. No. 4,877,382 or U.S. Pat. No. 5,102,316, the disclosures of which are incorporated herein by reference.

Referring now to FIG. 2, electrical enclosure 28 includes a lower housing 58, an upper housing 60, and a cavity 62. The lower housing 58 is mounted to the shell 14 using a plurality of studs 64 which are welded or otherwise fixedly attached to the shell 314. The upper housing 60 is matingly received by the lower housing 58 and defines the cavity 62 therebetween. The cavity 62 is operable to house respective components of the compressor protection and control system 12, as will be discussed further below.

With particular reference to FIGS. 1-6, the compressor protection and control system 12 is shown to include a sensor system 66, processing circuitry 68, and a power interruption system 70. The sensor system 66, processing circuitry 68, and power interruption system 70 cooperate to detect and correct fault conditions in an effort to prevent damage to the compressor 10 and to alert a user to the fault condition (i.e., via light emitting devices (LED) and the like). The compressor protection and control system 12 detects and responds to run winding delay, motor overload, missing phase, reverse phase, motor winding current imbalance, open circuit, low voltage, locked rotor currents, excessive motor winding temperature, high discharge temperature conditions, low oil pressure, lack of three phase power, open thermistors, welded or open contactors, and short cycling. For example, a compressor protection and control system 12 for a certain type and size compressor may be as summarized in Table 1.

TABLE 1

| ALARM | OCCURRENCE | ACTION | LED | LOCKOUT | RESET |
|---|---|---|---|---|---|
| Run Winding Delay | Excessive delay in energizing one winding after a first winding is energized | Trip (open contactor relay), wait 5 minutes, then close contactor relay | Red flashes one time between pauses | 10 Trips In a Row | Normal run winding operation OR Cycle power |
| Missing Phase | One phase is missing | Trip (open contactor relay), wait 5 minutes, then close contactor relay | Red flashes two times between pauses | 10 Trips In a Row | All three phases present OR Cycle power |
| Reverse Phase | Three phase power leads are connected improperly causing motor to run backwards | Trip (open contactor relay), wait 5 minutes, then close contactor relay | Red flashes three times between pauses | 4 Trips In a Row | Phase orientation correct OR Cycle power |
| Welded Contactor | Contactor is providing three phase power to compressor when | None | Red flashes four times | None | N/A |

TABLE 1-continued

| ALARM | OCCURRENCE | ACTION | LED | LOCKOUT | RESET |
|---|---|---|---|---|---|
| | contactor should be open | | between pauses | | |
| Low Voltage | Supply voltage to AMPS is below the alarm threshold | Trip (open contactor relay), wait 5 minutes | Red flashes five times between pauses | None | Supply voltage remains in "normal" range |
| No Three Phase Power | Current is not detected at compressor terminals when demand is present | None | Red flashes five times between pauses | None | Three phase current is detected when demand is present OR demand is not present and no current is detected |
| Low Oil Pressure | Oil pressure is too low for an extended period of time | Trip (open contactor relay), close contactor relay when oil relay closes | Red flashes one time between pauses | None | Oil pressure sensor alarm relay is open |
| Discharge Temperature | Discharge temperature is too high | Trip (open contactor relay), wait 30 minutes, then close contactor relay | Red flashes two times between pauses | 4 Trips In 3 Hours | Discharge temps remain in "normal" range OR Cycle power |
| Motor Temperature | Motor temperature is too high OR motor temperature sensor is short circuited | Trip (open contactor relay), wait 30 minutes, then close contactor relay | Red flashes three times between pauses | 4 Trips In 3 Hours | Motor temps remain in "normal" range OR Cycle power |
| Locked Rotor | Current to compressor exceeds 300 Amps or fails to decrease from initial locked rotor current level or exceeds 300 Amps or 40% of peak locked rotor Amps (LRA) while running | Trip (open contactor relay), wait 5 minutes, then close contactor relay | Red flashes four times between pauses | 4 Trips In a Row | Current to compressor remains in "normal" range OR Cycle power |
| Motor Overload | Current to compressor exceeds maximum continuous current (MCC) rating | Trip (open contactor relay), wait 5 minutes, then close contactor relay | Red flashes five times between pauses | None | Current to compressor remains in "normal" range |
| Open Thermistor | One or more discharge/motor temperature sensors are disconnected | Trip (open contactor relay), wait 30 minutes, then close contactor relay | Red flashes six times between pauses | None | Discharge temps remain in "normal" range OR Cycle power |

As shown above in Table 1, a run winding delay is generally defined as an excessive delay in energizing one winding after a first winding is energized. When a start winding has been energized, a run winding must be energized within two seconds. If the run winding is not energized within this time period, the system 12 shuts down the compressor motor 32. If the run winding is energized first, the start winding must be energized within two seconds. If the start winding is not energized within this time period, the system 12 similarly shuts down the motor 32. For a plural compressor 10c (FIG. 19) the system 12 senses both the start and run winding current at start up. When the compressor 10c is in the running state, if either the start or run winding completely drop out for more than two seconds, the system 12 shuts down the motor 32.

A missing phase fault is generally defined when one phase of the motor 32 is missing. Once the start winding is energized, the system 12 ensures that current is present in all phases within 700 milliseconds after current is detected in one of the phases. If current is detected in at least one phase and no current is detected in the other phase(s), then the system 12 shuts down the motor 32. Generally speaking, a current imbalance of greater than 50 percent is required before the motor 32 is interrupted. The run winding is monitored and protected against missing phase in a similar fashion. During normal running operation (i.e., while demand is present), if a loss of current in any phase of the motor 32 is detected for a period of one second, the motor 32 is shut down.

A reverse phase is generally defined when three phase power leads are connected improperly, thereby causing the motor 32 to run backwards. If the phase sequence of the three phase power is incorrect, the system 12 shuts down the compressor 10. The phase sequence is measured roughly 700 milliseconds after the demand signal and current is sensed in the start winding. It should be noted that the motor 32 may rotate "backwards" for a short period of time after power has been removed from the compressor 10 due to pressure equalization. Due to this phenomenon, reverse phase is only monitored for roughly the first five seconds of each compressor start cycle.

A welded contactor fault is declared when a contactor supplies three phase power to the compressor 10 when contactor should be open. This condition is detected after the motor 32 has been shut down. If current persists after roughly two seconds of shutdown, then it will be assumed that the contacts have welded or mechanically "jammed" shut.

A motor overload condition is generally referred to a situation where current to the compressor 10 exceeds a maximum continuous current (MCC) rating. Overload current is defined as current that exceeds 110 percent rated MCC for more than 60 seconds. If the part winding motor current in any leg of either start or run winding exceeds the pre-programmed limit, then the system 12 shuts down the motor 32. The MCC overload detection does not start until five seconds after start up and continues until shutdown. If a compressor's MCC is not programmed, overload current is detected by the motor temperature sensor(s). The system 12 detects a missing compressor MCC parameter when it determines that the MCC value is set to zero Amps, which is the default setting for the compressor 10.

A locked rotor condition is declared when current to the compressor 10 exceeds roughly 300 Amps, fails to decrease from an initial locked rotor current level, exceeds 300 Amps, or is roughly 40 percent of peak locked rotor Amps (LRA) while running. The locked rotor current during start up is expected to decrease within one second after the motor 32 comes up to speed and settles down to a normal running current level. The system maintains a 100 millisecond buffer of the current readings for the run and start windings. When compressor demand is high, indicating the compressor has started, the highest peak current in the buffer is recorded as the locked rotor current. The peak locked rotor current is recorded as greater than 300 Amps, or as the specific peak value if less than 300 Amps.

If the peak locked rotor current in the start winding is greater than 300 Amps, a second reading is taken roughly 800 milliseconds after start up (compressor demand is measured high). If the start winding current value is greater than 300 Amps 800 milliseconds after start up, then the system 12 assumes that the motor 32 is mechanically seized and that power to the motor 32 should be interrupted. If the peak locked rotor current in the start winding is less than 300 Amps, a second reading is taken roughly 800 milliseconds after start up (compressor demand is measured high). If the second reading has not dropped to a level less than 40 percent of the peak LRA measured, power to the compressor motor 32 is interrupted.

For locked rotor conditions that occur after start up has completed, the peak locked rotor current measured is used. If the peak locked rotor current is greater than 300 Amps, and the running current is measured above 300 Amps for 500 milliseconds, power to the motor 32 is interrupted. If the peak locked rotor current is less than 300 Amps, and the running current is greater than 40 percent of that peak locked rotor current measured and recorded, power is similarly interrupted. If a peak locked rotor current of less than 100 Amps is measured, the locked rotor detection is disabled for that compressor run cycle. Such control eliminates nuisance trips if the timing of the start up is disrupted during troubleshooting of the equipment.

A low voltage fault is declared, and the compressor 12 is shut down, if the 220 VAC supply power to the system 12 falls below 170 VAC when a compressor demand signal is present. When the voltage falls to this level, the compressor 10 is not allowed to start. Excessive arcing due to contactor coil chattering during low voltage conditions can lead to a welded contactor and therefore the compressor 10 is shut down under such circumstances. The occurrence of low voltage must persist for roughly two seconds before an alarm is recorded and power to the motor 32 is interrupted. The voltage must rise above 180 VAC for a minimum of two seconds to reset the alarm.

Discharge temperature is monitored to ensure that the discharge temperature is not above a predetermined threshold value in an effort to protect the motor 32 and associated scrolls 40, 48. The system 12 monitors the discharge temperature in at least two locations and, if a resistance value is greater than roughly 1.33 k$\Omega$+/−5 percent, power to the motor 32 is interrupted. Power remains interrupted until the resistance falls below roughly 600 $\Omega$+/−5 percent and a thirty (30) minute delay has been completed.

The temperature of the motor 32 is monitored by using at least one positive-temperature-coefficient (PTC) device or negative-temperature-coefficient (NTC) device, which may be a thermistor-type sensor. If a PTC resistance value is greater than roughly 4.5 k$\Omega$+/−5 percent, power to the motor 32 is interrupted and remains as such until the PTC resistance falls below roughly 2.75 k$\Omega$+/−5 percent and a thirty (30) minute delay has been completed. A shorted thermistor input is read as a low resistance value and indicates the respective motor temperature sensor is jumpered or a board component has failed. Any PTC resistance below roughly 100 ohms is interpreted as a shorted thermistor.

An open thermistor fault is declared, and power to the motor 32 interrupted, if any thermistor input is read as open circuit. An open circuit is defined for NTC and PTC thermistors as a resistance higher than roughly 100 k$\Omega$. The resistance must be read at this level for 60 seconds while the compressor 10 is running.

If a compressor demand input is read high for two seconds, and no current is read in any of the current transformer inputs, a no three phase power alarm is declared. Whenever current is detected in any current transformer input or if the demand inputs are read low for two seconds, the alarm is reset.

In addition to detecting and reporting the above-described fault conditions (Table 1), the system 12 also detects and monitors "warning conditions." The warning conditions are not as severe as the fault conditions, and therefore do not cause protective action (i.e., interruption of power to the motor 32), but the warning conditions are monitored nonetheless and are used as diagnostics and in prevention of fault conditions. The warning conditions include a high ambient temperature warning, a motor overload warning, a locked rotor warning, a low supply voltage warning, a high supply voltage warning, a high discharge temperature warning, a discharge temperature sensor short circuit warning, a high motor temperature warning, a no configuration warning, and a contactor life warning, each of which is briefly described below.

A high ambient temperature warning is detected when an ambient temperature sensor measures a temperature above roughly 60° Celsius for more than 60 seconds continuously. The high ambient temperature warning is reset when the ambient temperature sensor measures below 60° Celsius for more than 60 seconds continuously.

A motor overload warning is detected when the motor current is at 100 percent MCC current level for more than 60 seconds. The motor overload warning is reset when the motor current level has dropped below 100 percent MCC current level for more than 60 seconds or when a motor overload alarm becomes active.

A locked rotor warning is detected when a locked rotor event is detected. Unlike the alarm, which requires multiple events, the warning is detected with a single event. The locked rotor warning is reset when the compressor 10 has run five minutes continuously without a locked rotor event, or when a locked rotor alarm becomes active.

A low supply voltage warning is detected when the supply voltage is below 180 VAC for two seconds. A low supply voltage warning is reset when the supply voltage is above 190 VAC for two seconds or when a Low Supply Voltage Alarm becomes active.

A high supply voltage warning is detected when the supply voltage is above 250 VAC for two seconds. A high supply voltage warning is reset when the supply voltage is above 240 VAC for two seconds.

A high discharge temperature warning is detected when the discharge temperature is less than 10° Celsius below the alarm set point for each sensor for two seconds. A high discharge temperature warning is reset when the discharge temperature is greater than 15° Celsius below the alarm set point for each sensor for two seconds, or a high discharge temperature alarm becomes active.

A discharge temperature sensor short circuit warning is detected when the resistance measured at the discharge temperature sensors is less than 100 Ω for two seconds. A discharge temperature sensor short circuit warning is reset when the resistance measured is greater than 1 kΩ for two seconds.

A high motor temperature warning is detected when a motor temperature is less than 10° Celsius below the alarm set point for two seconds.

A high motor temperature warning will be reset when a motor temperature is greater than 15° Celsius below the alarm set point for two seconds, or a high motor temperature alarm becomes active.

A no configuration warning is detected when the compressor model number, serial number and MCC current is not programmed into the memory. A no configuration warning is reset when the compressor model number, serial number AND MCC current is programmed into the memory. There is no check for accuracy of the text entered in for model and serial number and any non-zero number for MCC value is valid.

A contactor life warning is detected when the number of compressor starts equals 50,000 or a multiple of 50,000 (i.e., 100 k, 150 k, 200 k, etc.). A contactor life warning is reset when the system module is powered off and on, indicating the contactor has been inspected and/or replaced.

In general, the sensor system 66 detects compressor operating conditions such as the compressor faults listed above in Table 1 and the compressor warning conditions, and provides a signal to the processing circuitry 68 indicative thereof. The processing circuitry 68 is either a microcontroller or a microprocessor such as microcontroller model number PIC18F242, manufactured by Microchip Technology of Chandler, Arizona. The processing circuitry 68 is in communication with the power interruption system 70 and selectively actuates the power interruption system 70 in response to unfavorable conditions detected by the sensor system 66 such as, but not limited to, the aforementioned "fault conditions." More particularly, the power interruption system 70 selectively restricts power to the compressor motor 32 in response to direction from the processing circuitry 68 to prevent damage to the compressor 10 when sensed compressor operating conditions are outside of a predetermined limit.

With particular reference to FIGS. 3-6, the sensor system 66 is shown to include a scroll sensor 72, a motor temperature sensor 74, and a rotor sensor 76. The scroll sensor 72 is positioned generally proximate to the orbiting scroll member 40 and the non-orbiting scroll member 48 such that the temperature in an area surrounding the orbiting scroll member 40 and non-orbiting scroll member 48 may be detected. The motor temperature sensor 74 is positioned generally proximate to the windings 36 of the electric motor 32 and detects the temperature generally surrounding the windings 36.

The rotor sensor 76 is positioned proximate to the rotor 38 of electric motor 32 and senses when the rotor 38 is in a "locked rotor condition." When the rotor 38 is restricted from moving relative to the windings 36, a force is applied between the windings 36 and rotor 38 as the crankshaft 30 tries to rotate the windings 36. As can be appreciated, when the motor 32 attempts to rotate the crankshaft 30 and is restricted from doing so due to the locked condition of the rotor 38 relative to the windings 36, excessive current is drawn from an external power source and the rotor 38 begins to experience an elevated temperature. The increase in current draw is monitored by the rotor sensor 76 so that the compressor 10 may be shut down if a predetermined current is detected, as will be discussed further below.

Figure 4:
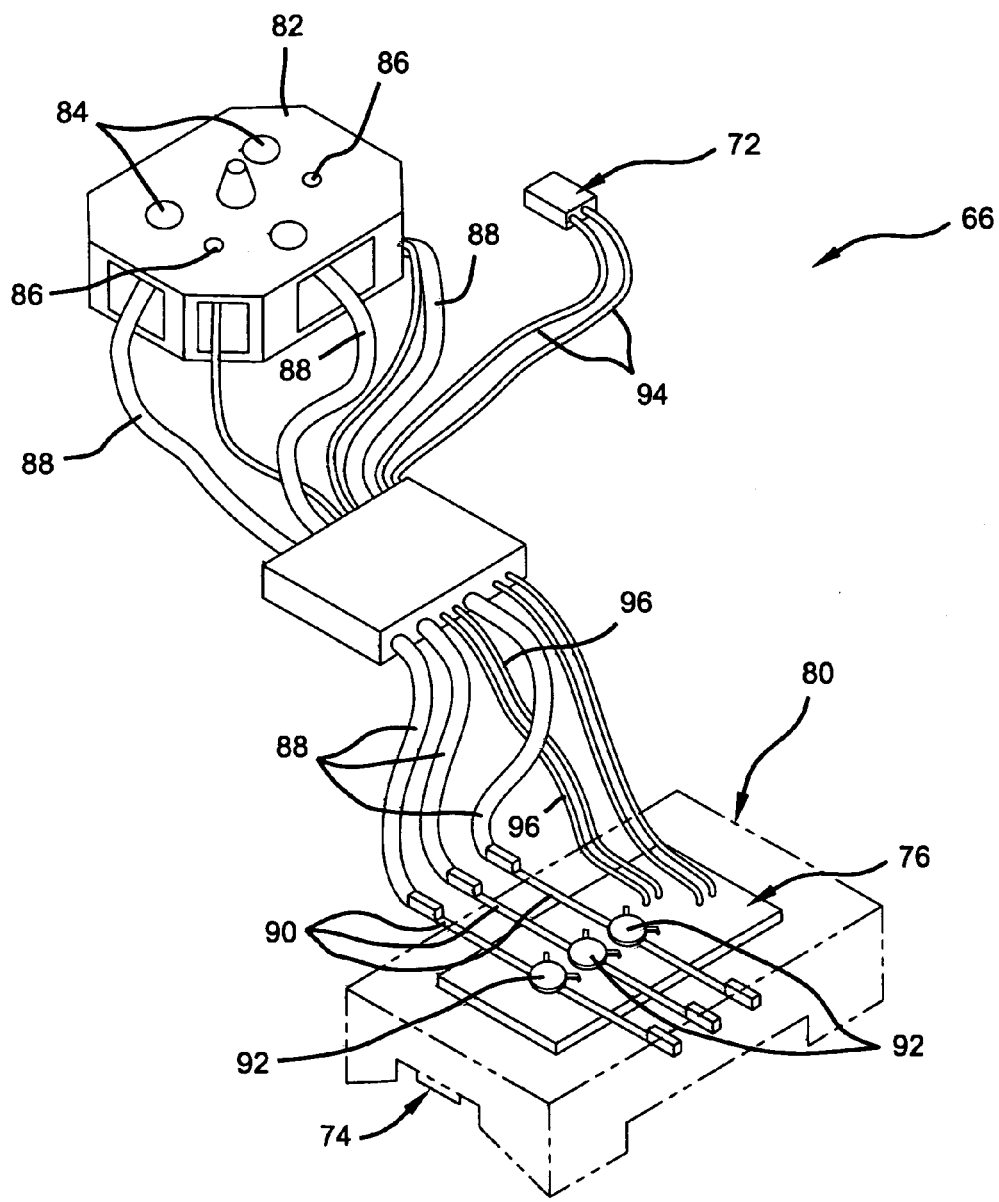
FIG. 4 is a perspective view of the protection system of FIG. 2.

With particular reference to FIG. 4, the sensor system 66 is shown to further include a cluster block 78 and a printed circuit board (PCB) 80. The cluster block 78 includes a housing 82, power apertures 84, and sensor apertures 86. The power apertures 84 are connected to three high-voltage leads 88 extending from the housing 82. The high-voltage leads 88 are operable to supply the electric motor 32 with power to thereby drive the crankshaft 30 and orbiting scroll member 40. The high-voltage leads 88 extend from the housing 82 and terminate at the PCB 80, as best shown in FIG. 4.

The PCB 80 operably supports the motor temperature sensor 74 and rotor sensor 76 in close proximity to the electric motor 32. The motor temperature sensor 74 is disposed on a bottom surface of the PCB 80 and is held in close proximity to the windings 36 of the motor 32 such that the motor temperature sensor 74 is able to detect temperature changes in the windings 36. The motor temperature sensor 74 is a thermistor able to detect temperature fluctuations in the windings 36 and may be configured as either a NTC or a PTC device, depending on the particular application. If the motor temperature sensor 74 is configured as a NTC device, the signals coming from the motor temperature sensor 74 are connected in parallel. If the motor temperature sensor 74 is configured as a PTC device, then the sensed signals coming from the motor temperature sensor 74 are connected in series.

The rotor sensor 76 is generally disposed on an opposite side of the PCB 80 from the motor temperature sensor 74, as best shown in FIG. 4. The rotor sensor 76 generally includes a sensor pin 90 electrically connected to a terminal end of each high-voltage lead 88. The sensor pins 90 are specially designed current carrying elements and are operable to localize an inherent electrical resistance of each pin at a specific point along its geometry indicative of the current flowing through each pin 90. As can be appreciated, the current flowing through each sensor pin 90 is dictated by the amount of power drawn by the electric motor 32. When the rotor 38 is in a locked condition, the motor 32 begins to draw more current through each pin 90, thereby increasing the temperature of each pin 90 at the localized point, as will be described further below.

In addition to the sensor pins 90, the rotor sensor 76 further includes a temperature sensor 92 disposed proximate to each sensor pin 90, as best shown in FIG. 4. The temperature sensors 92 detect a change in temperature along the length of the sensor pin 90, and may be configured as either an NTC or a PTC thermistor. Generally speaking, each temperature sensor 92 is positioned along the length of each sensor pin 90 such that it is proximate to the localized spot of increased electrical resistance so as to best detect a temperature change along the length of each individual pin 90. As can be appreciated, when more current is drawn through each sensor pin 90 by the electric motor 32, each pin 90 will experience electric resistance at the localized point, as previously discussed. By placing each temperature sensor 92 proximate to the localized point of resistance along each sensor pin 90, fluctuations in temperature caused by increased current draw through each sensor pin 90 will be quickly and accurately detected and may be fed back to the processing circuitry 68, as will be discussed further below.

In addition to supporting the motor temperature sensor 74 and rotor sensor 76, the PCB 80 is also operably connected to the scroll sensor 72, as best shown in FIG. 4. The scroll sensor 72 is a temperature sensor and is operable to detect temperature fluctuations proximate to, or caused by, the orbiting scroll member 40 and non-orbiting scroll member 48. The scroll sensor 72 is a thermistor and may be configured as an NTC thermistor or a PTC thermistor, depending on the particular application.

The PCB 80 serves as a termination point for the scroll sensor 72, motor temperature sensor 74, sensor pins 90, and temperature sensors 92. Specifically, the scroll sensor 72 is operably connected to the PCB 80 via low-voltage leads 94, while the motor temperature sensor 74 and temperature sensors 92 are directly connected and supported by the PCB 80, as best shown in FIG. 4. As previously discussed, each of the scroll sensor 72, motor temperature sensor 74, and rotor sensor 76 are operable to detect respective temperature fluctuations within the shell 14 of the compressor 10. Because each of the scroll sensor 72, motor temperature sensor 74, and rotor sensor 76 terminate at the PCB 80, the PCB 80 serves as a relay to transmit the sensed signals from each of the respective sensors 72, 74, 76, through the shell 14 of the compressor 10 to the processing circuitry 68 and power interruption system 70.

A low-voltage lead 96 extends from the PCB 80 to the cluster block 78 and is connected to the sensor apertures 86. As can be appreciated, the number of low-voltage leads 96 extending from the PCB 80 to the cluster block 78 will depend on the number of sensors disposed within the interior volume 22 of the compressor 10. In other words, the number of low-voltage leads extending from the PCB 80 to the cluster block 78 will generally equal the number of sensors 72, 74, 92 disposed within the compressor 10. However, each of the signals from the respective sensors 72, 74, 92 may be combined and sent from the PCB 80 to the cluster block 78 for transmission to the processing circuitry 68 and 70, thereby requiring a single lead extending between the PCB 80 and the cluster block 78. As can be appreciated, by combining the signals from the respective sensors 72, 74, 92, a reduction in the number of leads 96 extending from the PCB 80 to the cluster block 78 may be reduced.

Figure 3:
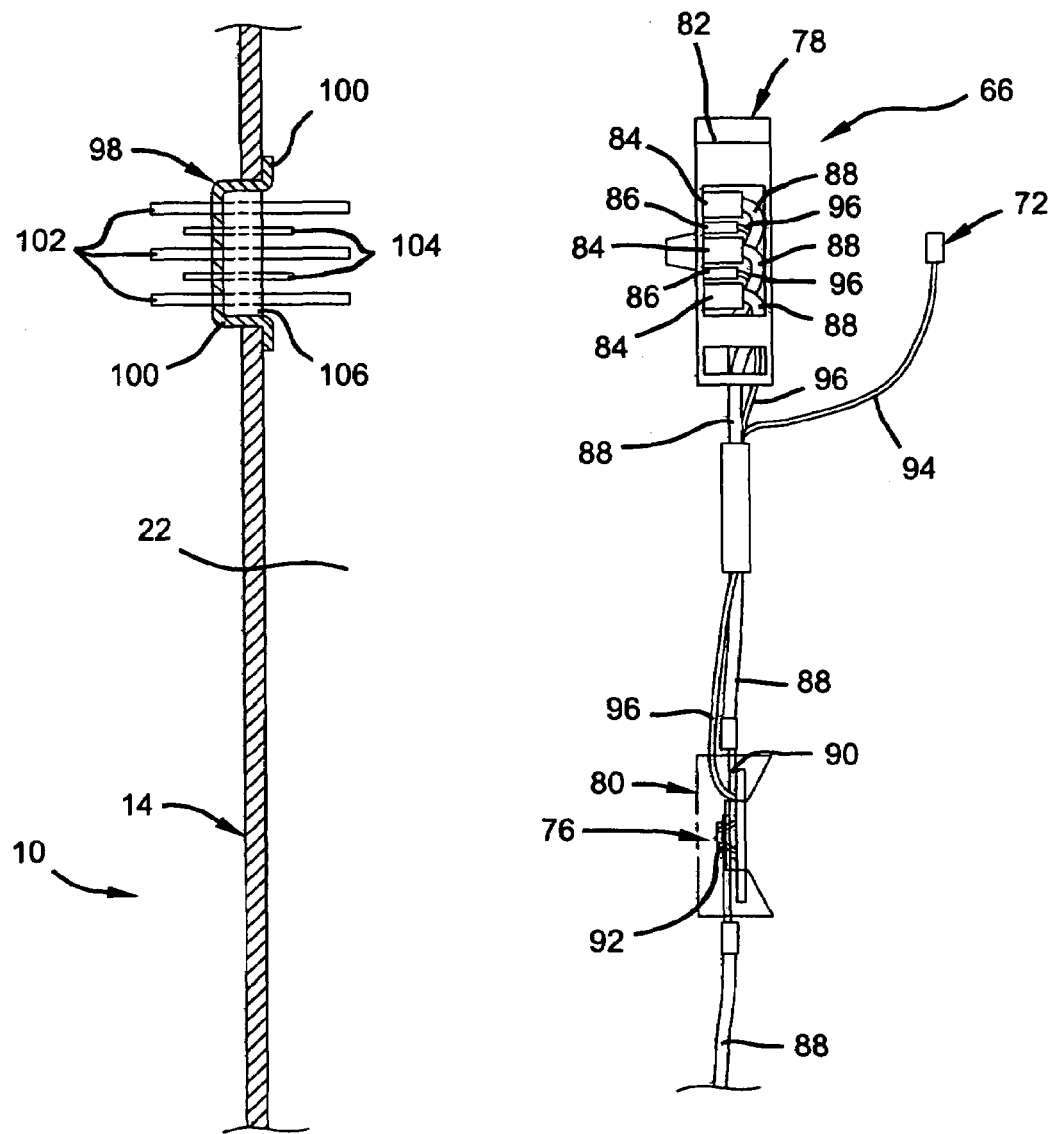
FIG. 3 is a more detailed sectional view of the protection system of FIG. 2.

As previously discussed, the sensor assembly 66 is in communication with the processing circuitry 68. To maintain a hermetic seal within the volume 22 of the compressor 10, a hermetic terminal assembly 98 is provided to establish an electrical connection between the sensor assembly 66 and processing circuitry 68, as best shown in FIG. 3.

The hermetic terminal assembly 98 includes a housing 100, a plurality of high-voltage pins 102, a plurality of low-voltage pins 104, and a hermetic sealing material 106 surrounding the high and low-voltage pins 102, 104. The housing 100 is fixedly attached to the shell 14 of the compressor 10 by a suitable means such as welding or braising. The high-voltage and low-voltage pins 102, 104 extend through the housing 100 such that the high-voltage and low-voltage pins 102, 104 extend from the interior volume 22 to an exterior surface of the compressor 10, as best shown in FIG. 3. The high-voltage and low-voltage pins 102, 104 are surrounded by the hermetic sealing material 106 such that a hermetic seal is formed from an exterior surface of each pin 102, 104 and the housing 100. In this manner, the terminal assembly 98 effectively allows communication between the sensor assembly 66 and processing circuitry 68 while maintaining the hermetic seal of the compressor 10.

The processing circuitry 68 is disposed on an outer surface of the compressor 10 and is in communication with both the terminal assembly 98 and the sensor assembly 66. Specifically, the processing circuitry 68 is housed generally within the electrical enclosure 28 and may be incorporated into a suitable plug 108 for interaction with the hermetic terminal assembly 98. Upon assembly, the plug 108 receives each of the high-voltage and low-voltage pins 102, 104 such that an electrical connection is made between the processing circuitry 68 and hermetic terminal assembly 98. In addition, the high-voltage and low-voltage pins 102, 104 are received into the power apertures 84 and sensor apertures 86, respectively, of the cluster block 78. In this manner, an electrical connection is made between the processing circuitry 68 and sensor assembly 66 via the hermetic terminal assembly 98 and plug 108. While a plug 108 has been described, it should be understood that any suitable connector may be used for transmitting a signal from within the compressor 10 to the processing circuitry 68.

In addition to being electrically connected to both the hermetic terminal assembly 98 and sensor assembly 66, the processing circuitry 68 is further connected to the power interruption system 70. The power interruption system 70 is disposed on an external surface of the compressor 10 and is operable to selectively permit or restrict power to the electric motor 32. As can be appreciated, when the sensors 72, 74, 92 indicate that conditions are unfavorable within the compressor 10, the processing circuitry 68 will direct the power interruption system 70 to restrict power from reaching the electric motor 32, thereby effectively shutting down the compressor 10. In this manner, the sensor assembly 66, processing circuitry 68, and power interruption system 70 are operable to shut down the compressor 10 via restricting power to the electric motor 32 when conditions in the compressor 10, or within a system the compressor 10 may be tied to, are unfavorable for further operation.

In addition to the above, the processing circuitry 68 also stores the configuration parameters of the compressor 10. Specifically, the compressor model, compressor serial number, motor sensor type, MCC level, discharge temperature, motor temperature, current transformer calibration offset, slave addressing, and device name are all stored within the processing circuitry 68. Of the above parameters, only the compressor model, serial number, slave addressing, and device name are field configurable.

Figure 5:
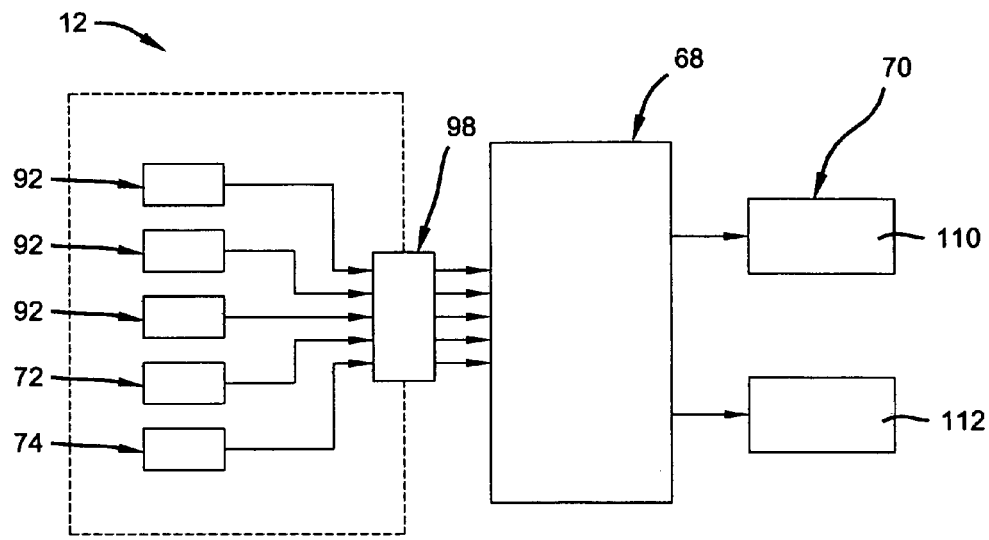
FIG. 5 is a schematic representation of the protection system of FIG. 2.
Figure 6:
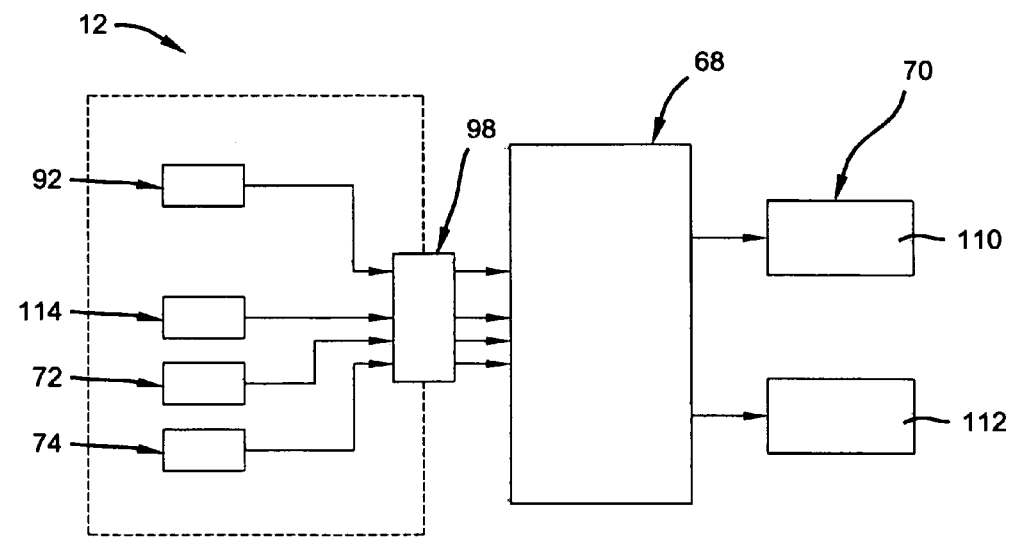
FIG. 6 is an alternate schematic representation of the protection system of FIG. 2.
Figure 7:
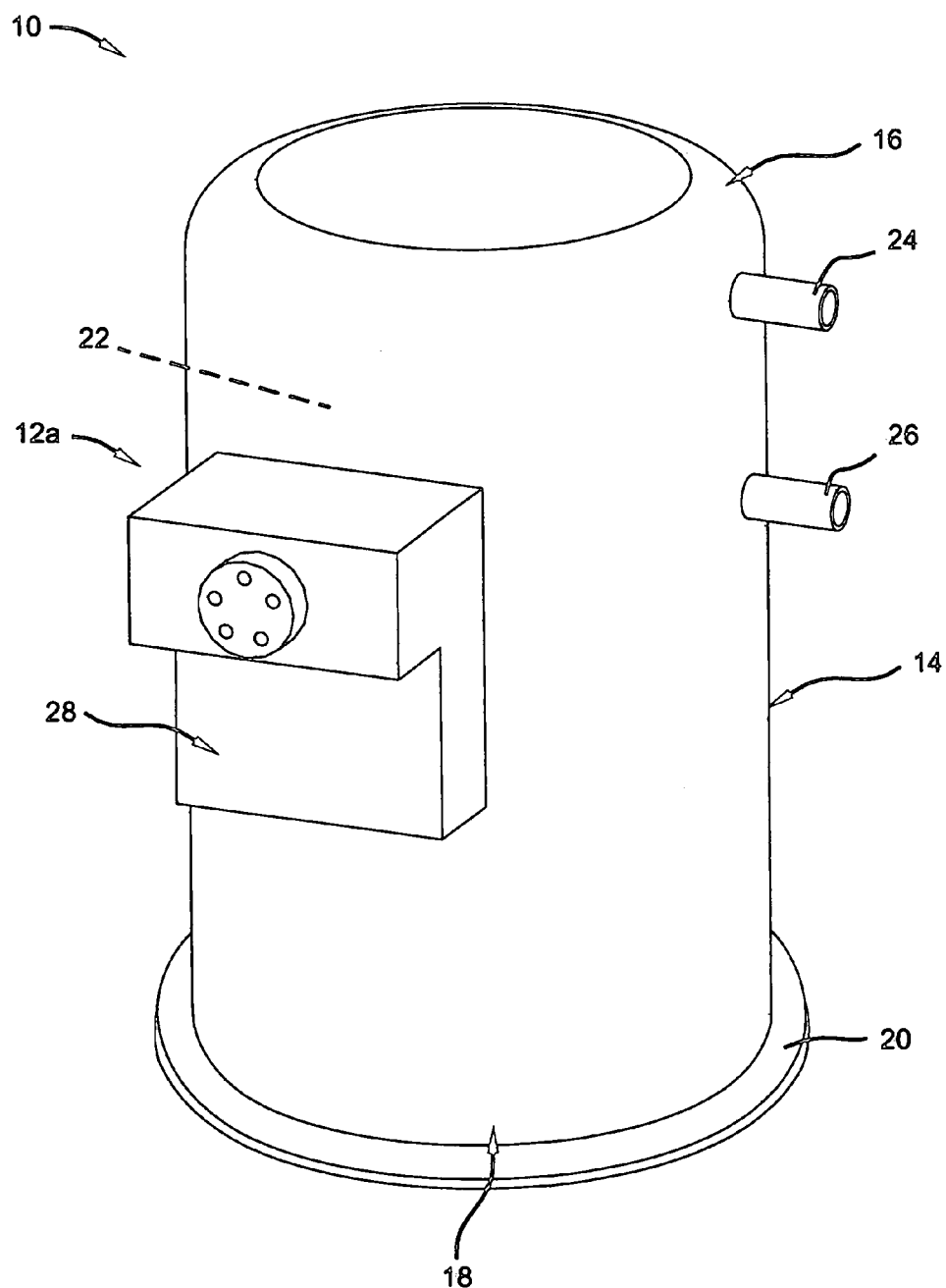
FIG. 7 is a perspective view of a compressor incorporating a second protection system in accordance with the teachings.

With particular reference to FIGS. 5 and 6, the operation of the compressor 10 and associated compressor protection and control system 12 will be described in detail. As previously discussed, the power interruption system 70 regulates power directed to the electric motor 32 of the compressor 10 by selectively engaging a contact 110 disposed external from the compressor 10 to thereby selectively restrict and permit power to the electric motor 32.

In operation, the processor 68 monitors the combined signal of both the motor temperature sensor 74 and scroll temperature sensor 72 and selectively shuts down the compressor 10 in response to detected system parameters. Specifically, if the actual value of the temperature detected by either the motor temperature sensor 74 or scroll temperature sensor 72 exceeds a preprogrammed limit such that a fault condition is detected, the processing circuitry 68 directs the power interruption system 70 to disconnect the contact 110, thereby restricting power from reaching the electric motor 32. In addition, the processing circuitry 68 further creates a fault signal and directs such signal to a diagnostic output 112 for recording. As can be appreciated, registered faults within the compressor 10 may be valuable diagnostic tools in tracking and preventing further faults and failures within the compressor 10. By sending fault signals to the diagnostic output 112, the processing circuitry 68 effectively registers each time the compressor 10 is shut down and maintains a record of each fault condition experienced.

As previously discussed, the rotor sensor 76 detects when the rotor 38 is locked relative to the windings 36. When the rotor 38 is in a "locked rotor condition" the electric motor 32 still draws current through the sensor pins 90 in an effort to rotate the crankshaft 30 and rotor 38 relative to the windings 36. In so doing, the electric motor 32 draws a significant amount of current through each sensor pin 90 to overcome the locked condition between the rotor 38 and windings 36, thereby increasing the temperature of each sensor pin 90. When the sensor pins 90 realize an increase in temperature, the temperature sensors 92 relay a signal indicative of the temperature increase back to the processing circuitry 68.

When the temperature sensors 92 indicate an increase in temperature at each pin 90, the processing circuitry 68 correlates the sensed temperature to a current flowing through each pin 90. In this manner, the temperature sensors 92 cooperate with the processing circuitry 68 to effectively function as a current sensor to monitor the current through each pin 90 and detect a locked rotor condition. When a threshold current has been established through the pins 90, the processing circuitry 68 is operable to direct the power interruption system 70 to restrict power to the motor 32 and shut down the compressor 10.

In addition to sending a signal to the power interruption system 70, the processing circuitry 68 also sends a diagnostic signal to the diagnostic output 112 to record the "locked rotor" fault experienced within the compressor 10. By storing and tracking faults, the compressor protection and control system 12 effectively allows a user to monitor and track problems experienced by the compressor 10 in an effort to prevent and detect problems in the future, as previously discussed.

Compressor protection and control system 12 has thus far been described as having three temperature sensors 92, each disposed proximate to the sensor pins 90. FIG. 5 schematically represents an input to the processing circuitry 68 from each one of the temperature sensors 92. It should be understood, however, that the three temperature sensors 92 could be fed into one signal, whereby the lone signal is sent to the processing circuitry 68 via hermetic terminal assembly 98, as best shown in FIG. 6. In such a relationship, the system 12 is simplified by reducing the number of signals coming from the individual temperature sensors 92. In addition to the aforementioned sensors 72, 74, 76, it should be understood that other sensors could be used within the compressor 10 and should be considered as part of the present invention. Specifically, it is anticipated that an oil level sensor or oil temperature sensor, generically referred to in FIG. 6 as 114, could also be incorporated into the compressor protection and control system 12 for use in tracking diagnostics within the compressor 10, and should be considered within the scope of the present invention.

With particular reference to FIGS. 7-11, a second embodiment of the compressor protection and control system 12 will be described in detail. In view of the substantial similarity in structure and function of the components associated with the compressor protection and control system 12 and the compressor protection and control system 12a, like reference numerals are used here and in the drawings to identify like components.

The compressor protection and control system 12a functions in a similar fashion to that of the compressor protection and control system 12, with respect to the scroll sensor 72 and motor temperature sensor 74. In this manner, detailed descriptions of the scroll sensor 72 and motor temperature sensor 74 are foregone.

The rotor sensor 76a is disposed within the electric box 28 and generally includes a sensor pin 90 electrically connected to a high-voltage lead 88. The sensor pins 90 are a specially designed current carrying elements and localize an inherent electrical resistance of each pin at a specific point along its geometry indicative of the current flowing through each pin 90. As can be appreciated, the current flowing through each sensor pin 90 is dictated by the amount of power drawn by the electric motor 32. When the rotor 38 is in a locked condition, the motor 32 begins to draw more current through each pin 90, thereby increasing the temperature of each pin 90 at the localized point, as will be described further below.

In addition to the sensor pins 90, the rotor sensor 76a further includes a temperature sensor 92 disposed proximate to each sensor pin 90. The temperature sensors 92 are operable to detect a change in temperature along the length of the sensor pin 90, and may be configured as either an NTC or a PTC thermistor. Generally speaking, each temperature sensor 92 is positioned along the length of each sensor pin 90 such that it is proximate to the localized spot of increased electrical resistance so as to best detect a temperature change along the length of each individual pin 90. As can be appreciated, when more current is drawn through each sensor pin 90 by the electric motor 32, each pin 90 experiences electric resistance at the localized point. By placing each temperature sensor 92 proximate to the localized point of resistance along each sensor pin 90, fluctuations in temperature caused by increased current draw through each sensor pin 90 will be quickly and accurately detected and may be fed back to the processing circuitry 68.

The rotor sensor 76a allows the processing circuitry 68 to more quickly respond to an increase in current draw by the motor 32 and therefore increases the ability of the compressor protection and control system 12a to protect the compressor 10. More particularly, because the rotor sensor 76a is disposed external from the interior space 22 of the compressor, the power drawn by the motor 32 may be monitored prior to actually entering the compressor shell 14. Monitoring the current draw upstream from the motor 32 allows for a quicker response time as the processing circuitry 68 is not required to wait for the current to travel along the high-voltage leads 88 and through the hermetic interface 98 prior to taking a reading. The improved response time allows the processing circuitry 68 to more quickly direct the power interruption system 70 to restrict power to the motor 32, and thus, reduces the probability of compressor damage.

With particular reference to FIGS. 12-18, a third embodiment of the compressor protection and control system 12 will be described in detail. In view of the substantial similarity in structure and function of the components associated with the compressor protection and control system 12 and the compressor protection and control system 12b, like reference numerals are used here and in the drawings to identify like components.

The compressor protection and control system 12b functions in a similar fashion to that of the compressor protection and control system 12, with respect to the scroll sensor 72 and motor temperature sensor 74. In this manner, detailed descriptions of the scroll sensor 72 and motor temperature sensor 74 are foregone.

The rotor sensor 76b is disposed within the electrical enclosure 28b such that the rotor sensor 76b is removed from the interior space 22 of the compressor 10. The rotor sensor 76b includes a cluster block 116 that matingly engages the hermetic terminal assembly 98 and a current sensor 118 that detects a current drawn by the electric motor 32.

Figure 13:
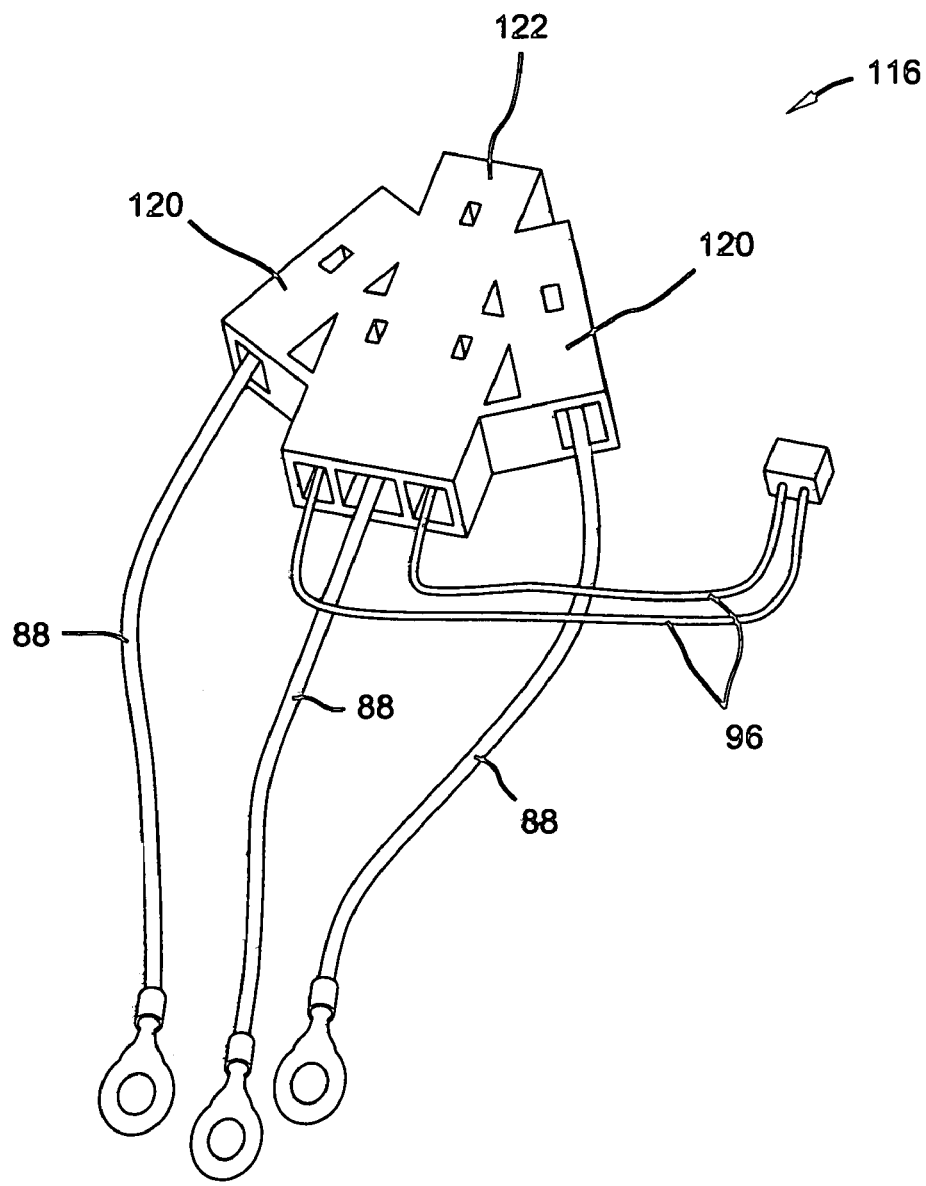
FIG. 13 is a perspective view of a cluster block of the protection system of FIG. 12.

The cluster block 116 includes a pair of arms 120 flanking a central body 122, as best shown in FIG. 13. Each of the arms 120 and central body 122 includes a high-voltage lead 88 extending therefrom. In addition, the main body 122 includes a pair of low-voltage leads 96 extending therefrom for receiving and transmitting signals from the sensor assembly 66b, as will be described further below. As best shown in FIG. 13, the cluster block 116 matingly engages the hermetic terminal assembly 98 such that each of the high-voltage leads 98 engage the high-voltage pins 102 and the low-voltage leads 96 engage the low-voltage pins 104. In this manner, the cluster block 116 effectively connects the high-voltage power leads 88 and low-voltage sensor leads 96 to the sensor system 66a and motor 32 disposed within the compressor 10.

Figure 14:
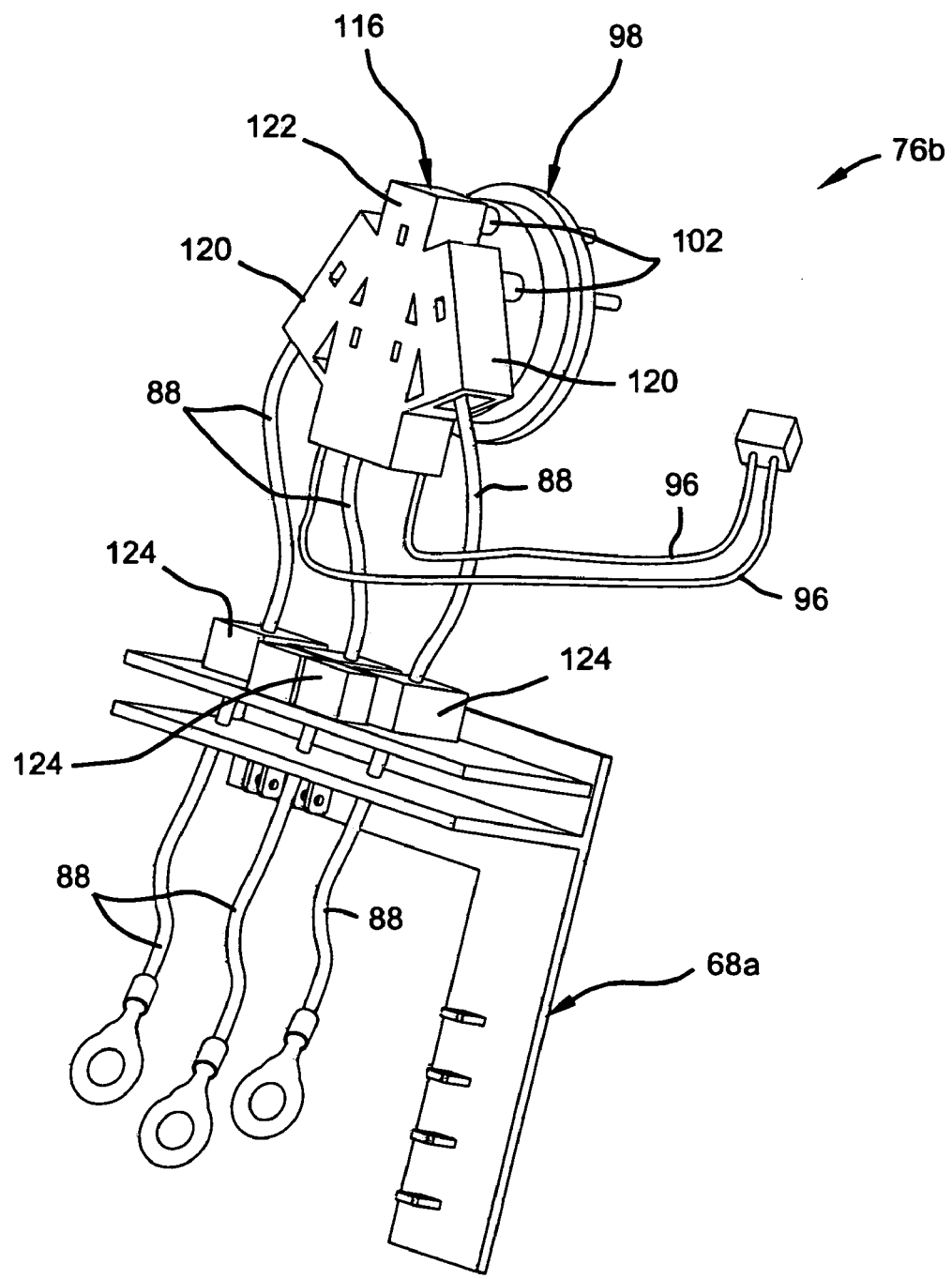
FIG. 14 is a perspective view of the cluster block of FIG. 13 incorporated into a current-sensor assembly.
Figure 15:
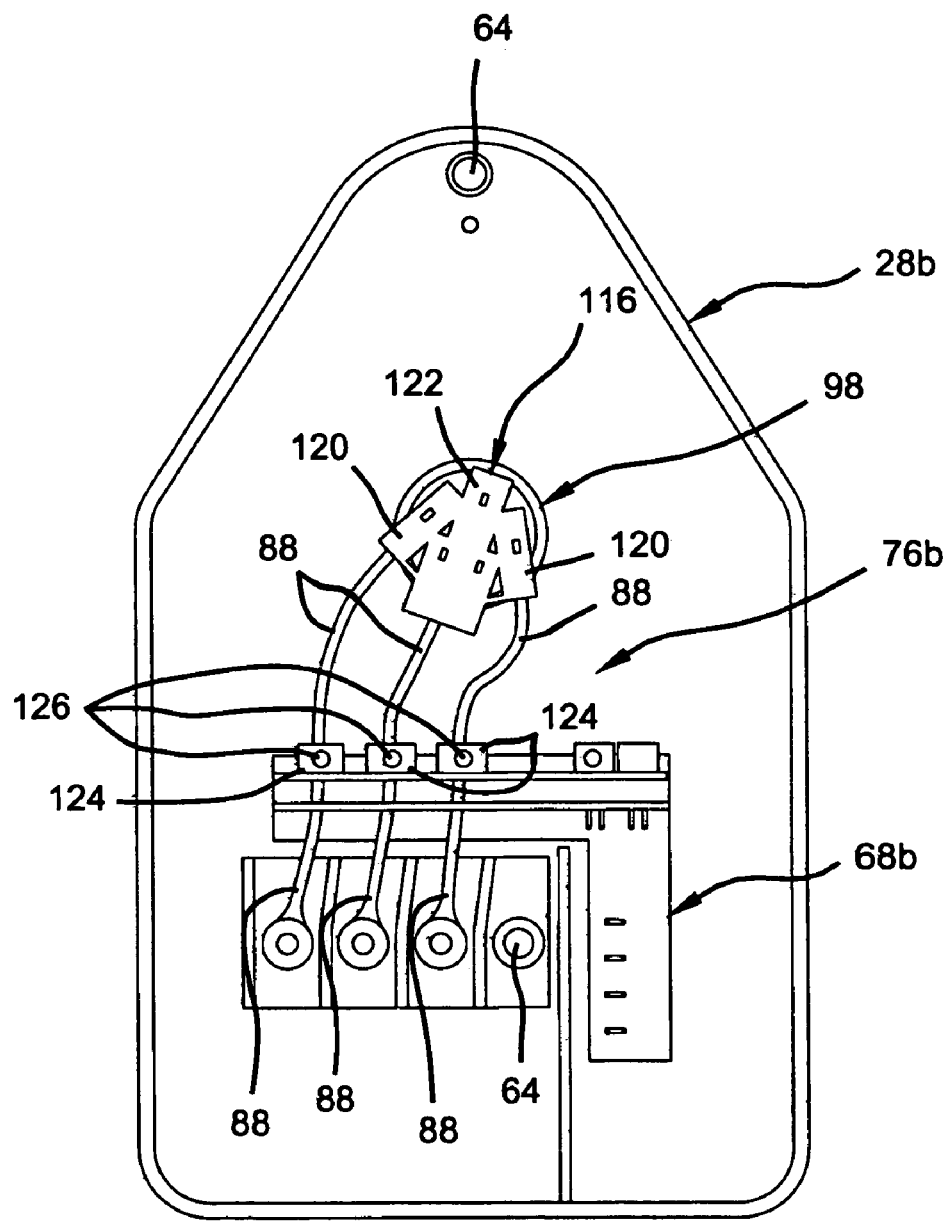
FIG. 15 is a front view of the cluster block and current-sensor assembly of FIG. 14 incorporated into a housing.
Figure 16:
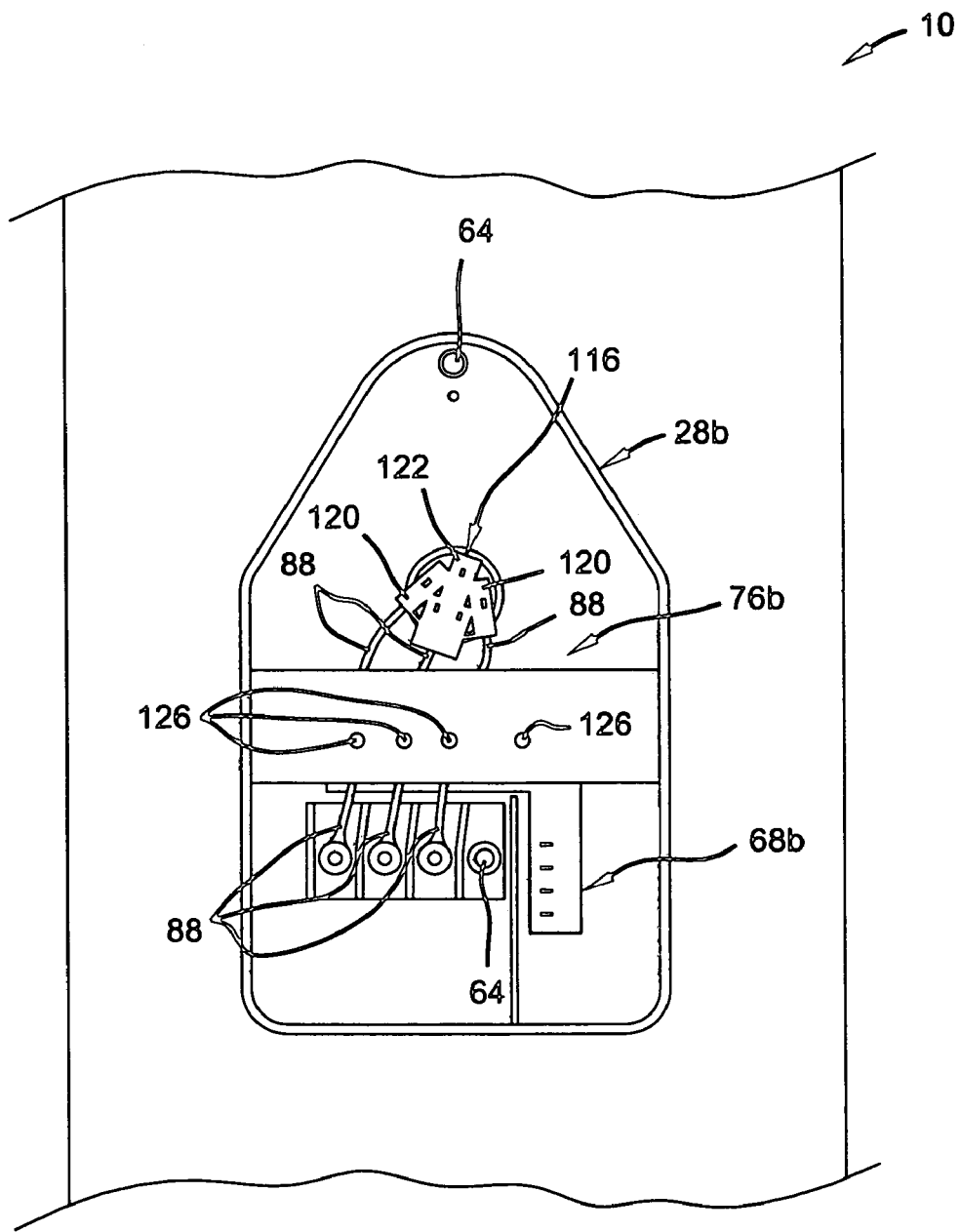
FIG. 16 is a front view of the cluster block and current-sensor assembly of FIG. 14 incorporated into a housing and mounted to the compressor of FIG. 12.

The current sensor 118 is disposed proximate to the cluster block 116, as best shown in FIG. 14. The current sensor 76b includes a series of individual sensing elements 124, each having a high-voltage lead 88 extending therethrough. The sensor elements 124 detect a current flowing through each of the high-voltage leads 88 and produce a signal indicative thereof. The signal produced by the sensing elements 124 is sent to the processing circuitry 68b to compare the sensed current to a threshold limit and determine whether the electric motor 32 is in a "locked rotor state" or another fault condition.

If the processing circuitry 68b determines that the current flowing through the high-voltage leads 88 exceeds the threshold limit, the processing circuitry 68b will send a signal to the power interruption system 70 to restrict power to the electric motor 32 and shut down the compressor 10.

As previously discussed, the processing circuitry 68b sends a signal to the power interruption system 70 to restrict power to the electric motor 32 should an undesirable condition be experienced within the compressor 10. In addition, the processing circuitry 68b also alerts an operator that a system fault has occurred within the compressor 10 by illuminating a series of light-emitting devices (LED) 126, as will be discussed further below.

With particular reference to FIGS. 14-18, the operation of the compressor 10 and associated compressor protection and control system 12b will be described in detail. As previously discussed, the scroll sensor 72, motor temperature sensor 74, and rotor sensor 76b detect operating conditions and parameters of the compressor 10. The sensed signals from the individual sensors 72, 74, 76b are sent to the processing circuitry 68b for comparison to a set of predetermined compressor operating parameters. Should the processing circuitry 68b determine that the sensed parameters from the individual sensors 72, 74, 76b exceed the predetermined compressor operating parameters, the processing circuitry 68b will alert the power interruption system 70 to restrict power to the electric motor 32 to thereby shut down the compressor 10.

Figure 17:
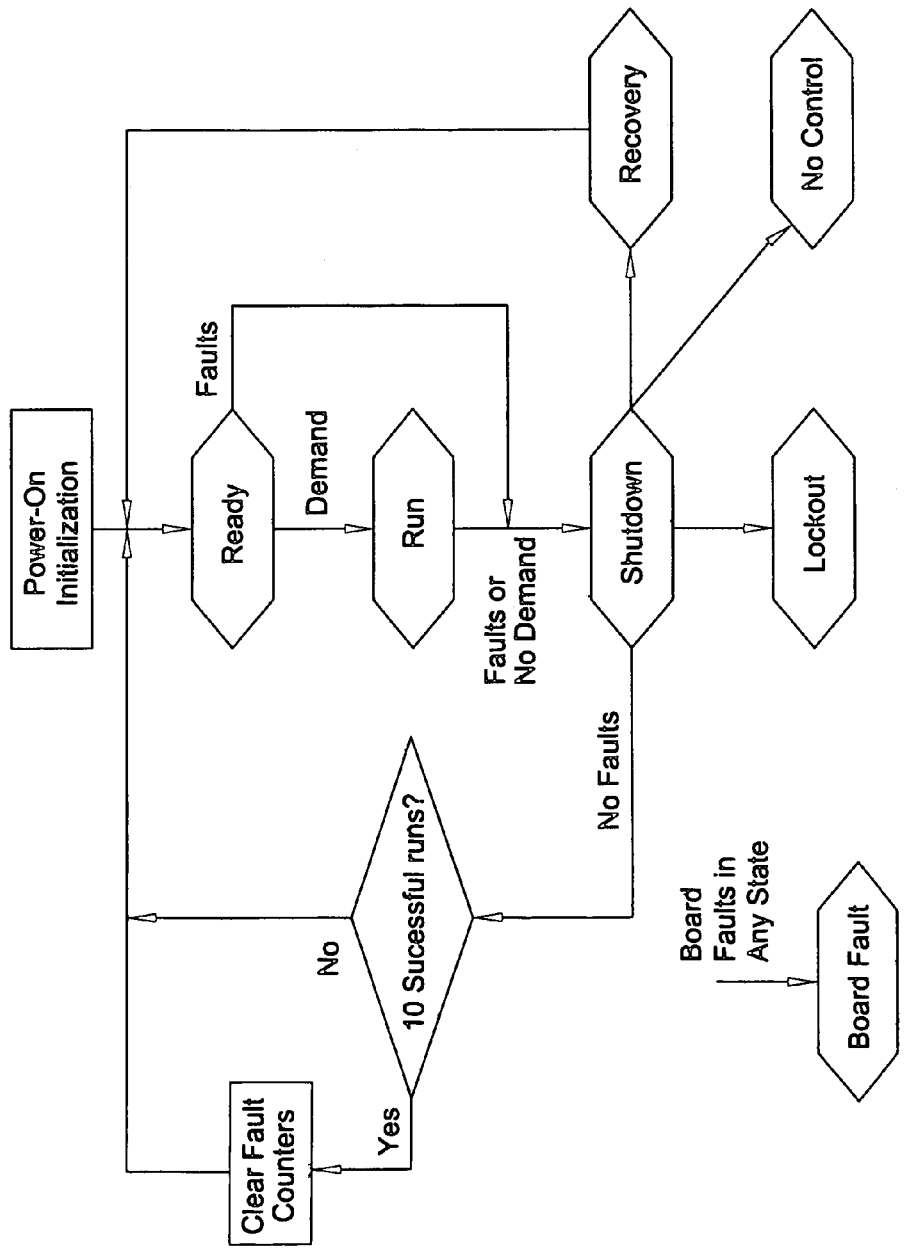
FIG. 17 is a flow-chart depicting operation of a compressor in accordance with the teachings.

When the compressor 10 is initially started, the system is in a ready mode, as indicated in FIG. 17. At this point, the processing circuitry 68b checks for any fault conditions. If a fault condition is detected, the processing circuitry 68b bypasses the run mode of the compressor 10 and causes the compressor 10 to enter a shutdown mode. In the shutdown mode, the compressor 10 attempts to recover the system without fully shutting down power to the electric motor 32, depending on the particular fault condition experienced. However, if the fault condition experienced is a significant fault, the shutdown mode enters a lockout or a no control phase, whereby the compressor 10 will need to be shut down completely such that power is restricted from reaching the electric motor 32. In such a condition, the compressor 10 is not able to enter the run mode until the processing circuitry 68b directs the power interruption system 70 to restrict power to the electric motor 32. Restarting the compressor 10 by restricting power often clears the fault and allows the compressor 10 to properly operate.

Figure 18:
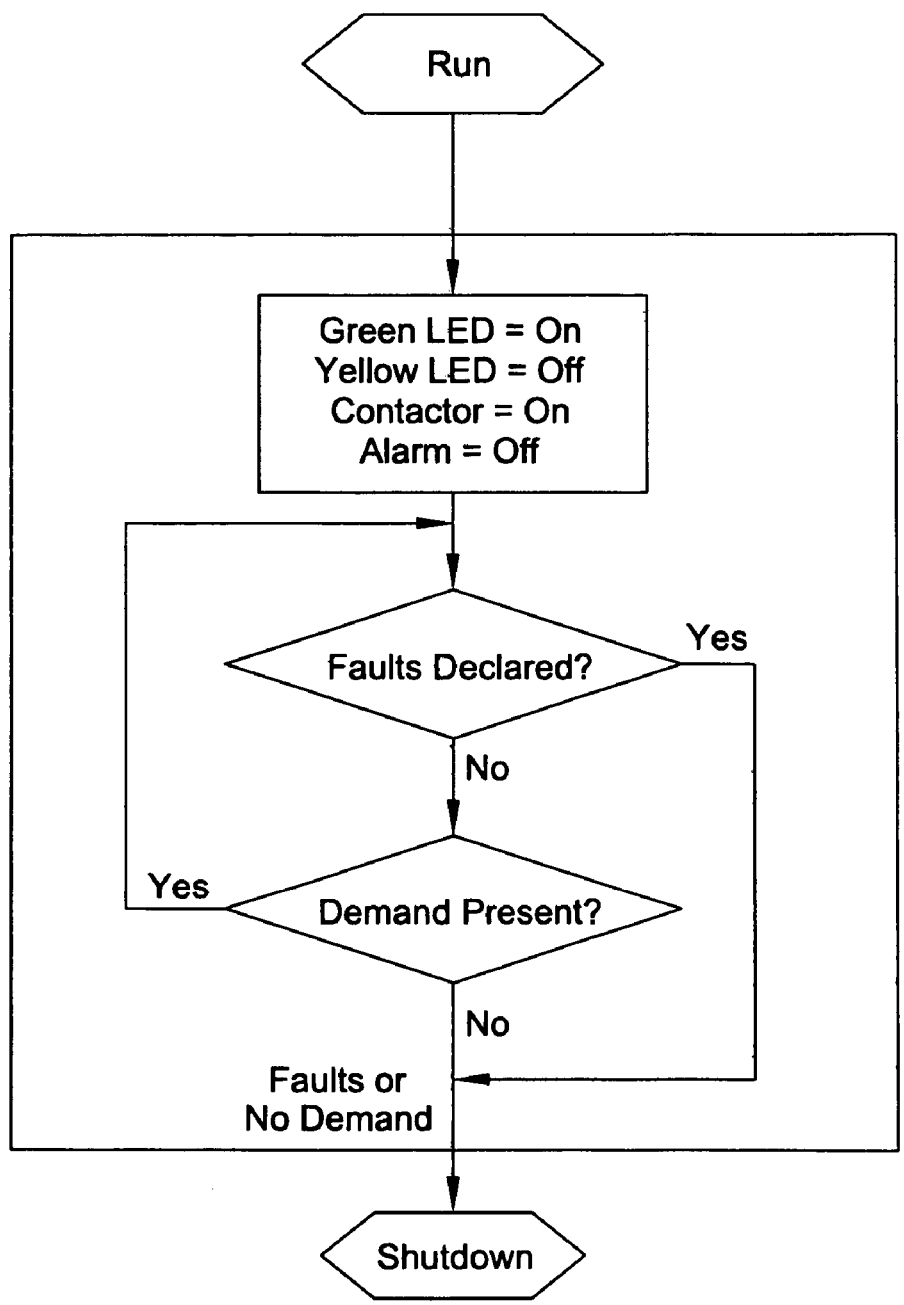
FIG. 18 is a flow-chart depicting operation of a compressor between a run condition and a shutdown condition in accordance with the teachings.

When the compressor 10 is returned to the ready mode, or when the compressor 10 is initially started from startup and no fault conditions are detected, the compressor 10 enters the run mode, as indicated in FIGS. 17 and 18. The compressor 10 continues to run and the processing circuitry 68b will cause the diagnostic 112 to continually record each successful run. Once ten successful runs have been achieved, the processing circuitry 68b clears the fault memory and restarts the system anew. In this manner, the processing circuitry 68b receives sensed system parameters from the individual sensors 72, 74, 76b and selectively shuts down the compressor 10 when system conditions warrant. In addition, the processing circuitry 68b also collects data during an operational mode of the compressor 10 via diagnostic 112 to thereby store and track faults. As can be appreciated, by storing and tracking such faults, the processing circuitry 68b is able to detect and prevent possible future failures and faults by the compressor 10.

When the compressor 10 is in the run mode, the LED 126 illuminates a green light to indicate that the compressor 10 is running under normal conditions, as best shown in FIG. 18. In addition, a second LED 126 may also be illuminated to indicate that the contactor 110 is supplying power to the electric motor 32. In the event that a fault is detected, a yellow LED 126 is illuminated to indicate that the compressor 10 has experienced a fault and is in need of attention. If the processing circuitry 68b determines that the fault condition is a significant fault, such that the compressor 10 will not be able to recover without shutting down, the processing circuitry 68b directs the power interruption system 70 to restrict power to the compressor 10, as previously discussed.

When the power interruption system 70 shuts down the compressor 10, a red LED 126 is illuminated to alert an operator that the compressor 10 has been shut down due to a fault condition. At this point, the green "run" and "contractor" LEDs 126 is turned off to indicate that the compressor 10 is no longer running under normal conditions, and that the contactor 110 has been disengaged from the power supply. It should be noted that at this point, the only LED 126 illuminated is the red alarm, indicating that the compressor 10 has been shut down and has logged a fault. As can be appreciated, by using such LEDs 126, the compressor protection and control system 12b allows the compressor 10 to indicate when a fault condition has been experienced so that proper actions can be taken, as best shown in FIG. 18.

Generally speaking, the LED alarms are divided into supply power alarms and compressor alarms. The respective supply power and compressor alarms are communicated to the user by denoting a specific alarm with a designated number of LED flashes. Specifically, the supply power alarms include run winding delay (one flash), missing phase (two flashes), reverse phase (three flashes), welded contactor (four flashes), low voltage (five flashes), and no three phase power (six flashes). The compressor alarms include low oil pressure (one flash), discharge temperature (two flashes), motor temperature (three flashes), locked rotor (four flashes), motor overload (five flashes), and open thermistor (six flashes). Therefore, the user can easily determine the respective fault condition by simply referring to the respective LED 126.

Figure 19:
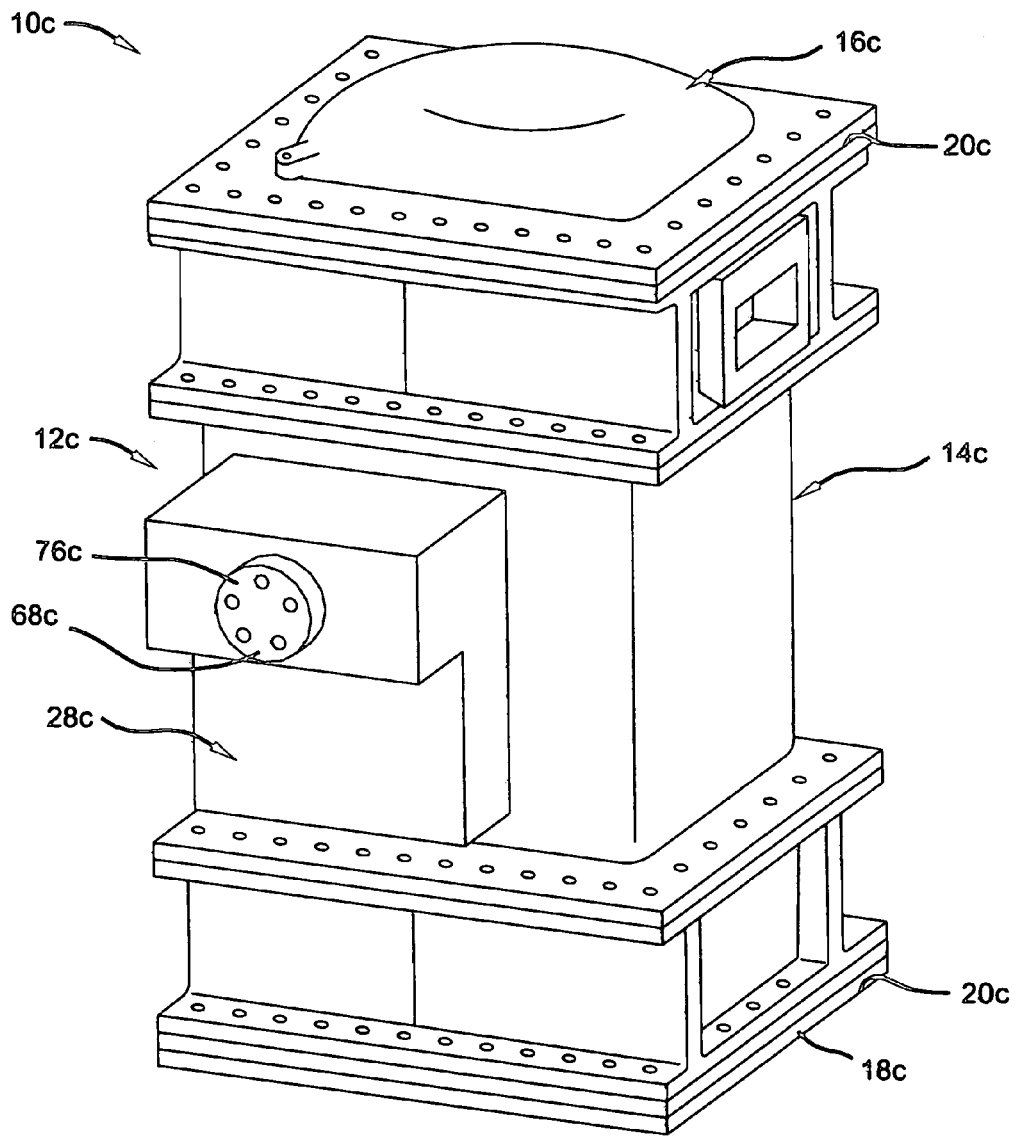
FIG. 19 is a perspective view of a compressor incorporating a fourth protection system in accordance with the teachings.
Figure 20:
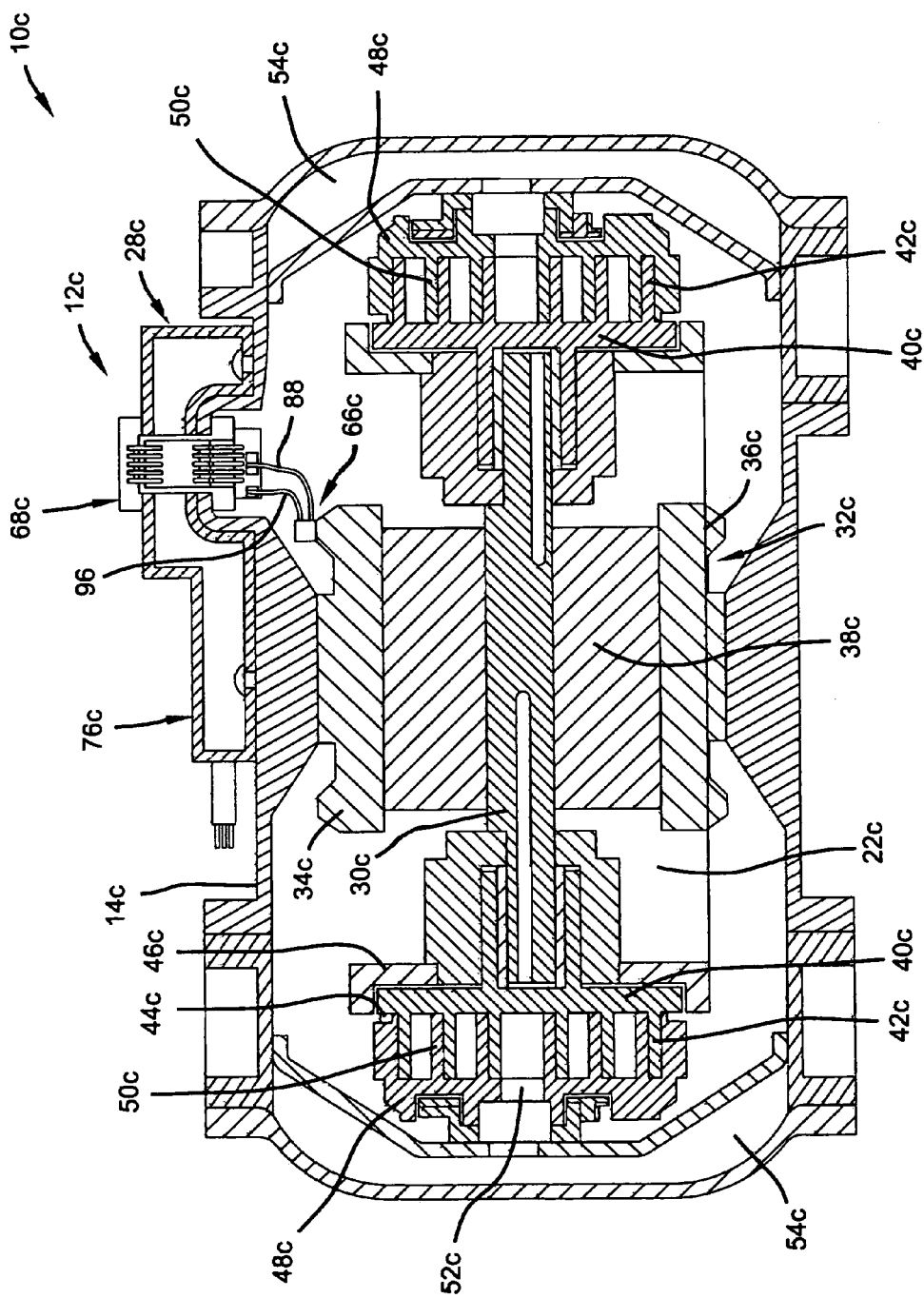
FIG. 20 is a cross-sectional view of the compressor of FIG. 19.

With particular reference to FIGS. 19-20, a fourth embodiment of the compressor protection and control system 12 will be described in detail. In view of the substantial similarity in structure and function of the components associated with the compressor protection and control system 12 and the compressor protection and control system 12c, like reference numerals are used here and in the drawings to identify like components.

With reference to FIG. 19, the plural compressor 10c is shown to include a generally cylindrical hermetic shell 14c having a pair of welded caps 16c, 18c and a plurality of feet 20c. The caps 16c, 18c are fitted to the shell 14c such that an interior volume 22c of the compressor 10c is defined. In addition, an electrical enclosure 28c is fixedly attached to the shell 14c generally between the caps 16c, 18c and operably supports a portion of the protection system 12c therein, as will be discussed further below.

A crankshaft 30c is rotatively driven by an electric motor 32c relative to the shell 14c. The motor 32c includes a stator 34c fixedly supported by the hermetic shell 14c, windings 36c passing therethrough, and a rotor 38c press fitted on the crankshaft 30c. The motor 32c and associated stator 34c, windings 36c, and rotor 38c are operable to drive the crankshaft 30c relative to the shell 14c to thereby compress a fluid.

The plural compressor 10c further includes a pair of orbiting scroll members 40c, each having a spiral vane or wrap 42c on the upper surface thereof for use in receiving and compressing a fluid. An Oldham coupling 44c is positioned between orbiting scroll members 40c and a bearing housing 46c and is keyed to orbiting scroll members 40c and a pair of non-orbiting scroll members 48c. The Oldham coupling 44c is operable to transmit rotational forces from the crankshaft 30c to the orbiting scroll members 40c to thereby compress a fluid disposed between the orbiting scroll members 40c and non-orbiting scroll members 48c. Oldham coupling 44c and its interaction with orbiting scroll members 40c and non-orbiting scroll members 48c is preferably of the type disclosed in assignee's commonly-owned U.S. Pat. No. 5,320,506, the disclosure of which is incorporated herein by reference.

Non-orbiting scroll members 48c also include a wrap 50c positioned in meshing engagement with wrap 42c of orbiting scroll members 40c. Non-orbiting scroll members 48c have a centrally disposed discharge passage 52c which communicates with an upwardly open recess 54c. Recesses 54c serve to store compressed fluid disposed at opposite ends of the interior volume 22c such that a first recess 54c is positioned proximate cap 16c and a second recess 54c is positioned proximate cap 18c.

Plural compressor 10c is preferably of the type disclosed in assignee's commonly-owned U.S. Pat. No. 6,672,846 and U.S. Pat. application Ser. No. 10/600,106 filed on Jun. 20, 2003, published as U.S. 2004-0258542A1, the disclosures of which are incorporated herein by reference.

The compressor protection and control system 12c functions in a similar fashion to that of the compressor protection and control system 12b, with respect to the scroll sensor 72 and motor temperature sensor 74. In this manner, detailed descriptions of the scroll sensor 72 and motor temperature sensor 74 are foregone.

The rotor sensor 76c is disposed generally within electrical box 28c such that current to the motor 32c is sensed prior to entering the shell 14c. The rotor sensor 76c is substantially identical to sensor 76b, but requires three additional sensing elements 124 to handle an additional current draw by the motor 32c. Specifically, because the plural compressor 10c drives a pair of orbiting scroll members 40c relative to a pair of non-orbiting scroll members 48c, a larger motor 32c is required and, thus, more current is drawn. The increased power requirement causes additional high-voltage lines 88 to extend between the hermetic terminal assembly 98 and motor 32c. In this manner, the rotor sensor 76c requires a total of six sensing elements 124 to accommodate the additional high-voltage leads 88.

Figure 21:
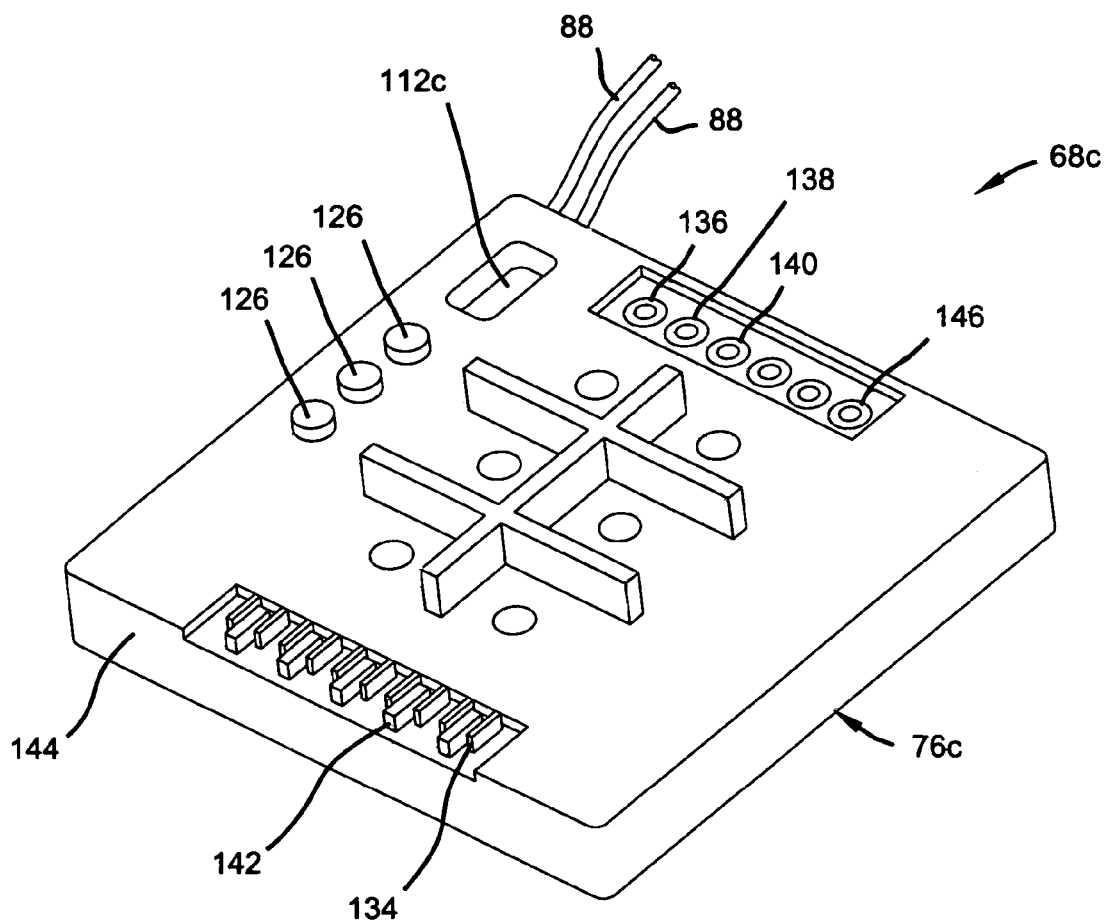
FIG. 21 is a perspective view of the protection system of FIG. 19.
Figure 22:
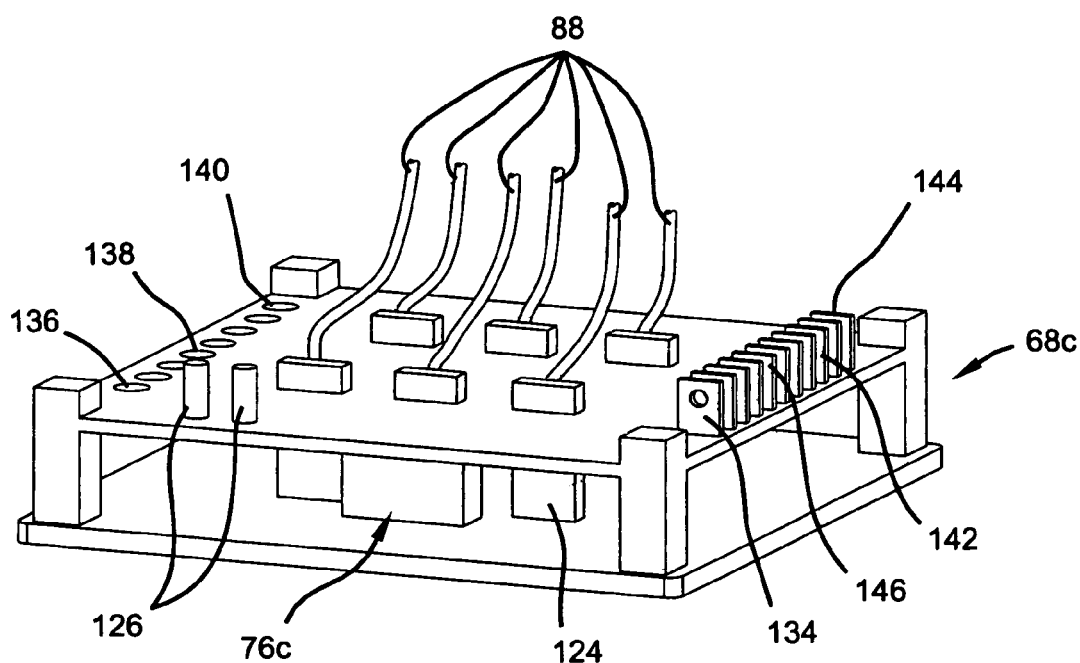
FIG. 22 is a perspective view of the protection system of FIG. 20 showing a current-sensing arrangement.

FIGS. 21 and 22 show a perspective view of the processing circuitry 68c and rotor sensor 76c. Six sensing elements 124 are shown proximate to high-voltage leads 88, such that the current drawn by the motor 32c is monitored. In addition, a plurality of sensor inputs are shown such as oil level inputs 134, motor temperature sensor inputs 136, discharge temperature inputs 138, 140, alarm relays 140, power inputs 142, and contactor inputs 144. In addition, a communication port 112c is shown for communication with an external network, as will be discussed further below. As can be appreciated, the inputs may be varied depending on the particular application and will be largely dependent upon the sensor system 66c disposed within the compressor 10c. For example, a scroll-temperature input 146 could be added if a scroll sensor 72 is used within the compressor 10c, as best shown in FIG. 21.

Figure 23:
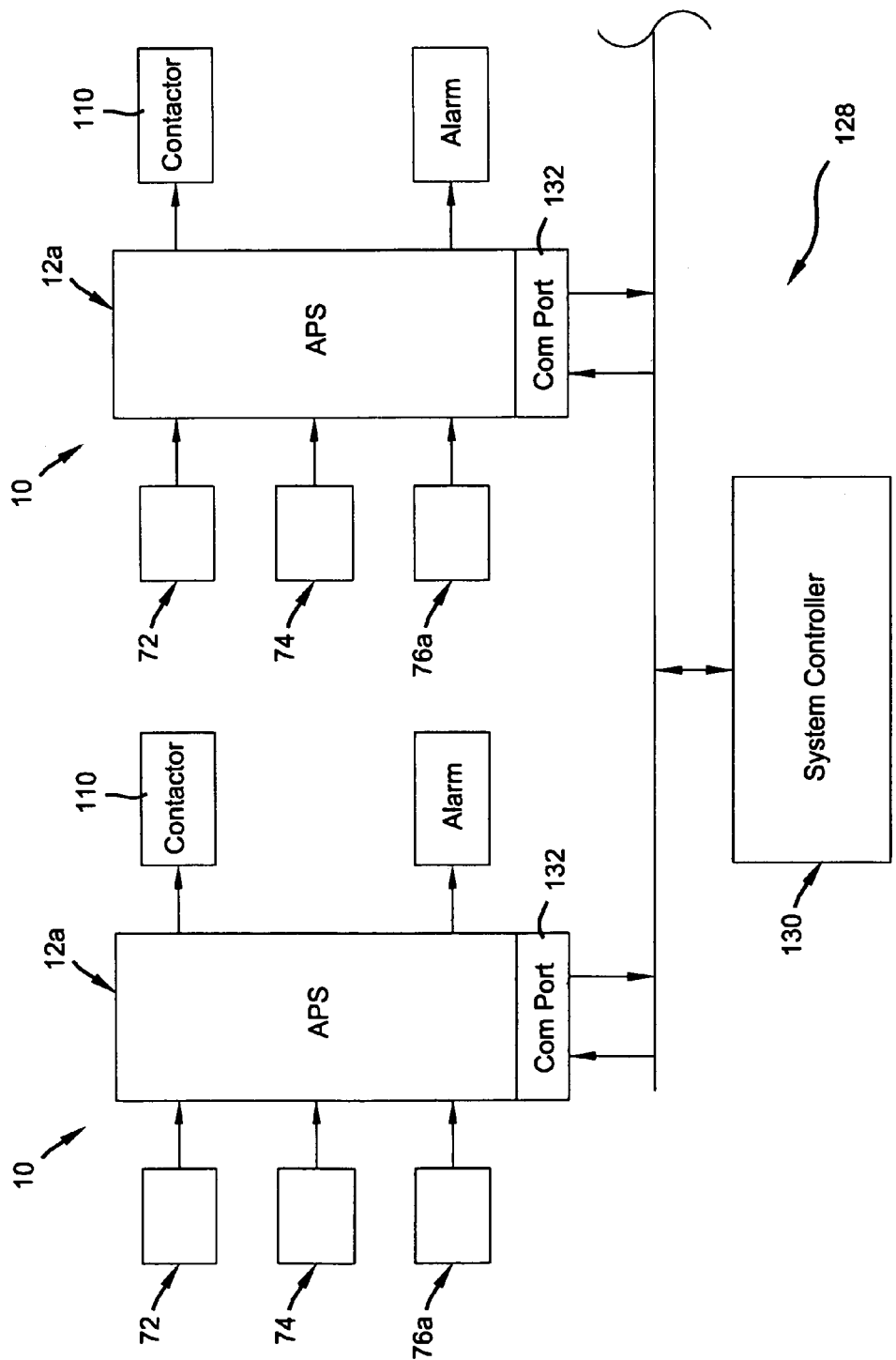
FIG. 23 is a schematic representation of a compressor network in accordance with the teachings.

With particular reference to FIG. 23, the compressor 10 and associated compressor protection and control system 12 are shown incorporated into a network 128. While the network 128 will be described with reference to compressor 10 and compressor protection and control system 12bit should be understood that compressor 10c and other protection and control systems 12, 12a, 12c could similarly be used in such a network. The network 128 includes a system controller 138 and a plurality of compressors 10. Each compressor 10 is in communication with a system controller 130 via a communications port 132. The communications port 132 may be linked to the diagnostic 112 such that faults recorded by the processing circuitry 68b logged in the diagnostic 112 may be supplied to the communication port 132 and system controller 130. By doing so, the faults experienced by each individual compressor 10 may be recorded and logged so that the proper maintenance may be performed on each compressor 10. While the compressor protection and control system 12b has been described incorporated into the network 128, it should be understood that the compressor protection and control system 12 could similarly be implemented into such a network, and as such, should be considered within the scope of the present invention.

As described, the compressor protection and control system 12 and compressor protection and control system 12b provide the compressor 10 with the ability to detect and sense system parameters, to alert potential faults through the use of LEDs 126, and to store faults via diagnostic 112. In addition, in the case of the locked rotor condition, each of the current sensors 76, 76b provide the system with the ability to detect current draw by the motor 32, rather than relying solely on sensed motor temperatures. As can be appreciated, by sensing current draw, rather than waiting for a temperature signal to be produced and analyzed, the systems 12, 12a, 12b, 12c provide a quicker response time and thereby increase the productivity and performance of the compressor 10.

The description is merely exemplary in nature and, thus, variations are intended to be within the scope of the teachings and not as a departure from the spirit and scope of the teachings.

What is claimed is:

1. A compressor assembly comprising:
    a shell;
    a compressor housed within said shell;
    a motor drivingly connected to said compressor;
    at least one temperature sensor;
    a printed circuit board associated with said at least one temperature sensor;
    processing circuitry receiving data from said printed circuit board to determine operating conditions of said compressor;
    a pin supplying said motor with current and including a measurement region disposed along said pin, said at least one temperature sensor disposed proximate to said measurement region.

2. The compressor assembly of claim 1, wherein said at least one temperature sensor is a negative temperature coefficient sensor.

3. The compressor assembly of claim 1, wherein said pin is disposed within said shell.

4. The compressor assembly of claim 1, wherein said pin is disposed external to said shell.

5. The compressor assembly of claim 1, wherein said measurement region includes a smaller cross-sectional area of said pin.

6. The compressor assembly of claim 1, wherein said pin is supported by said printed circuit board.

7. The compressor assembly of claim 1, wherein said processing circuitry determines current drawn by said motor based on temperature data received from said printed circuit board.

8. The compressor assembly of claim 1, wherein said at least one temperature sensor includes a motor temperature sensor.

9. The compressor assembly of claim 1, wherein said at least one temperature sensor includes a compressor temperature sensor.

10. The compressor assembly of claim 1, further comprising a hermetic feed-through assembly that connects at least one of said printed circuit board and said at least one temperature sensor to said processing circuitry through said shell to maintain a hermetic seal of said compressor.

11. The compressor assembly of claim 1, wherein said processing circuitry further comprises a series of light emitting devices that selectively illuminate in response to sensed compressor parameters.

12. The compressor assembly of claim 1, wherein said processing circuitry is disposed external from said shell.

13. A compressor assembly comprising:
    a shell;
    a compressor housed within said shell;
    a motor drivingly connected to said compressor;
    at least one temperature sensor;
    a pin supplying said motor with current, supported by a printed circuit board, and including a measurement region disposed along said pin, said at least one temperature sensor disposed proximate to said measurement region.

14. The compressor assembly of claim 13, wherein said at least one temperature sensor is a negative temperature coefficient sensor.

15. The compressor assembly of claim 13, wherein said pin is disposed within said shell.

16. The compressor assembly of claim 13, wherein said pin is disposed external to said shell.

17. The compressor assembly of claim 13, further comprising processing circuitry determining current drawn by said motor based on temperature data received from said at least one temperature sensor.

18. The compressor assembly of claim 13, wherein said at least one temperature sensor includes a motor temperature sensor.

19. The compressor assembly of claim 13, wherein said at least one temperature sensor includes a compressor temperature sensor.

20. The compressor assembly of claim 13, further comprising a hermetic feed-through assembly that connects at least one of a printed circuit board and said at least one temperature sensor to processing circuitry through said shell to maintain a hermetic seal of said compressor.

21. The compressor assembly of claim 20, wherein said processing circuitry is disposed external from said shell.

22. A compressor assembly comprising:
    a shell;
    a compressor housed within said shell;
    a motor drivingly connected to said compressor;
    at least one temperature sensor;
    a pin supplying said motor with current and including a measurement region disposed along said pin, said at least one temperature sensor disposed proximate to said measurement region,
    processing circuitry determining current drawn by said motor based on temperature data received from said at least one temperature sensor.

23. The compressor assembly of claim 22, wherein said at least one temperature sensor is a negative temperature coefficient sensor.

24. The compressor assembly of claim 22, wherein said pin is disposed within said shell.

25. The compressor assembly of claim 22, wherein said pin is disposed external to said shell.

26. The compressor assembly of claim 22, wherein said pin is supported by a printed circuit board.

27. The compressor assembly of claim 22, wherein said at least one temperature sensor includes a motor temperature sensor.

28. The compressor assembly of claim 22, wherein said at least one temperature sensor includes a compressor temperature sensor.

29. The compressor assembly of claim 22, further comprising a hermetic feed-through assembly that connects at least one of a printed circuit board and said at least one temperature sensor to processing circuitry through said shell to maintain a hermetic seal of said compressor.

30. The compressor assembly of claim 29, wherein said processing circuitry is disposed external from said shell.

* * * * *

UNITED STATES PATENT AND TRADEMARK OFFICE
CERTIFICATE OF CORRECTION

| | | |
|---|---|---|
| PATENT NO. | : 7,648,342 B2 | Page 1 of 1 |
| APPLICATION NO. | : 11/402316 | |
| DATED | : January 19, 2010 | |
| INVENTOR(S) | : Nagaraj Jayanth | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 91 days.

| | |
|---|---|
| Column 4, Line 20 | "shell 314" should be --shell 14--. |
| Column 10, Line 57 | "36of the motor 32such" should be --36 of the motor 32 such--. |
| Column 14, Line 39 | "72and" should be --72 and--. |
| Column 14, Line 43 | After "are," delete "a.". |
| Column 18, Line 33 | "32c ." should be --32c.--. |
| Column 18, Line 61 | "12bit" should be --12b. it--. |

Signed and Sealed this

Twenty-sixth Day of October, 2010

David J. Kappos
*Director of the United States Patent and Trademark Office*